United States Patent
Gould

(10) Patent No.: US 11,281,068 B2
(45) Date of Patent: Mar. 22, 2022

(54) HIGH-EFFICIENCY MULTI-SLOT WAVEGUIDE NANO-OPTO-ELECTROMECHANICAL PHASE MODULATOR

(71) Applicant: Lightmatter, Inc., Boston, MA (US)

(72) Inventor: Michael Gould, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 17/103,694

(22) Filed: Nov. 24, 2020

(65) Prior Publication Data

US 2021/0080799 A1 Mar. 18, 2021

Related U.S. Application Data

(63) Continuation of application No. 16/411,476, filed on May 14, 2019, now Pat. No. 10,884,313.
(Continued)

(51) Int. Cl.
*G02F 1/225* (2006.01)
*G02F 1/00* (2006.01)
(Continued)

(52) U.S. Cl.
CPC ......... *G02F 1/2257* (2013.01); *G02B 6/1223* (2013.01); *G02B 6/1225* (2013.01);
(Continued)

(58) Field of Classification Search
CPC ........................... G02F 1/2257; G02B 6/3508
See application file for complete search history.

(56) References Cited

U.S. PATENT DOCUMENTS 4,567,569 A 1/1986 Caulfield et al.
4,633,428 A 12/1986 Byron
(Continued)

FOREIGN PATENT DOCUMENTS

CN 101630178 A 1/2010
WO WO 2005/029404 A2 3/2005
(Continued)

OTHER PUBLICATIONS

De Leonardis F, De Carlo M, Passaro VMN. "Design Rules for a Nano-Opto-Mechanical Actuator Based on Suspended Slot Waveguides"; Photonics; 4(3):43, https://doi.org/10.3390/photonics4030043, 2017. (Year: 2017).*
(Continued)

*Primary Examiner* — Omar R Rojas
(74) *Attorney, Agent, or Firm* — Wolf, Greenfield & Sacks, P.C.

(57) ABSTRACT

A nano-opto-electro-mechanical System (NOEMS) phase shifter is described. The NOEMS may include a multi-slot waveguide structure suspended in air. The multi-slot waveguide structure may include three or more waveguides separated from each other by slots. The width of the slots may be sufficiently small to support slot modes, where a substantial portion of the mode energy is within the slots. For example, the slots may have widths less than 200 nm or less than 100 nm. The multi-slot waveguide structure may be disposed in a trench formed though the upper cladding of a substrate. An undercut may be formed under the multi-slot waveguide structure to enable free motion of the structure. NOEMS phase modulators of the types described herein may be used in connection with photonic processing systems, telecom/datacom systems, analog systems, etc.

20 Claims, 10 Drawing Sheets

Related U.S. Application Data

(60) Provisional application No. 62/792,720, filed on Jan. 15, 2019.

(51) Int. Cl.
*G02B 6/35* (2006.01)
*G02B 6/122* (2006.01)

(52) U.S. Cl.
CPC ......... *G02B 6/1228* (2013.01); *G02B 6/3508* (2013.01); *G02F 1/0018* (2013.01)

(56) References Cited

U.S. PATENT DOCUMENTS

| | | | |
|---|---|---|---|
| 5,004,309 | A | 4/1991 | Caulfield et al. |
| 5,077,619 | A | 12/1991 | Toms |
| 5,095,459 | A | 3/1992 | Ohta et al. |
| 5,428,711 | A | 6/1995 | Akiyama et al. |
| 5,699,449 | A | 12/1997 | Javidi |
| 6,005,998 | A | 12/1999 | Lee |
| 6,392,233 | B1 | 5/2002 | Channin et al. |
| 7,173,272 | B2 | 2/2007 | Ralph |
| 7,660,533 | B1 | 2/2010 | Meyers et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,035,540 | B2 | 10/2011 | Berkley et al. |
| 8,190,553 | B2 | 5/2012 | Routt |
| 8,223,414 | B2 | 7/2012 | Goto |
| 8,386,899 | B2 | 2/2013 | Goto et al. |
| 8,427,738 | B2 | 4/2013 | Stievater et al. |
| 8,560,282 | B2 | 10/2013 | Macready et al. |
| 8,604,944 | B2 | 12/2013 | Berkley et al. |
| 8,620,855 | B2 | 12/2013 | Bonderson |
| 8,639,074 | B2 | 1/2014 | Tang et al. |
| 8,837,544 | B2 | 9/2014 | Santori |
| 9,250,391 | B2 | 2/2016 | McLaughlin et al. |
| 9,354,039 | B2 | 5/2016 | Mower et al. |
| 9,663,353 | B2 | 5/2017 | Ofner et al. |
| 9,791,258 | B2 | 10/2017 | Mower |
| 10,359,272 | B2 | 7/2019 | Mower et al. |
| 10,884,313 | B2 | 1/2021 | Gould |
| 2002/0197025 | A1 | 12/2002 | Vaganov et al. |
| 2003/0086138 | A1 | 5/2003 | Pittman et al. |
| 2003/0235363 | A1 | 12/2003 | Pfeiffer |
| 2004/0243657 | A1 | 12/2004 | Goren et al. |
| 2005/0013557 | A1 | 1/2005 | Lu |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0273835 | A1 | 11/2008 | Popovic |
| 2009/0028554 | A1 | 1/2009 | Anderson et al. |
| 2009/0154872 | A1 | 6/2009 | Sherrer et al. |
| 2011/0064948 | A1 | 3/2011 | Plaut et al. |
| 2012/0096956 | A1 | 4/2012 | Sabarinathan et al. |
| 2013/0011093 | A1 | 1/2013 | Goh et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0118106 | A1 | 4/2016 | Yoshimura et al. |
| 2016/0162798 | A1 | 6/2016 | Marandi et al. |
| 2016/0246001 | A1 | 8/2016 | Uchida et al. |
| 2016/0261093 | A1 | 9/2016 | Noda et al. |
| 2017/0031101 | A1 | 2/2017 | Miller |
| 2017/0047312 | A1 | 2/2017 | Budd et al. |
| 2017/0139146 | A1 | 5/2017 | Novack et al. |
| 2017/0285373 | A1 | 10/2017 | Zhang et al. |
| 2017/0351293 | A1 | 12/2017 | Carolan et al. |
| 2018/0088274 | A1 | 3/2018 | LeGrange et al. |
| 2018/0274900 | A1 | 9/2018 | Mower et al. |
| 2018/0335574 | A1 | 11/2018 | Steinbrecher et al. |
| 2019/0304936 | A1 | 10/2019 | Shaul et al. |
| 2020/0116930 | A1 | 4/2020 | Kannan et al. |
| 2020/0225555 | A1 | 7/2020 | Gould |

FOREIGN PATENT DOCUMENTS

| | | |
|---|---|---|
| WO | WO 2006/023067 A2 | 3/2006 |
| WO | WO 2008/069490 A1 | 6/2008 |
| WO | WO 2018/098230 A1 | 5/2018 |

OTHER PUBLICATIONS

International Search Report and Written Opinion for International Application No. PCT/US2019/056276 dated Mar. 11, 2020.

International Search Report and Written Opinion for International Application No. PCT/US19/32133 dated Sep. 9, 2019.

International Search Report and Written Opinion from International Application No. PCT/US2015/034500, dated Mar. 15, 2016, 7 pages.

Invitation to Pay Additional Fees for International Application No. PCT/US2019/056276 mailed Dec. 13, 2019.

Invitation to Pay Additional Fees for International Application No. PCT/US19/32133 dated Jul. 15, 2019.

Aaronson et al., Computational complexity of linear optics. Proceedings of the 43rd Annual ACM Symposium on Theory of Computing. 2011. 101 pages. ISBN 978-1-4503-0691-1.

Abu-Mostafa et al., Optical neural computers. Scientific American. 1987:88-95.

Albert et al., Statistical mechanics of com-plex networks. Reviews of Modern Physics. 2002;(74):47-97.

Almeida et al., All-optical control of light on a silicon chip. Nature. 2004;431:1081-1084.

Amir et al., Classical diffusion of a quantum particle in a noisy environment. Physical Review E. 2009;79. 5 pages. DOI: 10.1103/PhysRevE.79.050105.

Amit et al., Spin-glass models of neural networks. Physical Review A. 1985;32(2):1007-1018.

Anitha et al., Comparative Study of High performance Braun's multiplier using FPGAs. IOSR Journal of Electrontrics and Commmunication Engineering (IOSRJECE). 2012;1:33-37.

Appeltant et al., Information processing using a single dynamical node as complex system. Nature Communications. 2011. 6 pages. DOI: 10.1038/ncomms1476.

Arjovsky et al., Unitary Evolution Recurrent Neural Networks. arXiv:1511.06464. 2016. 9 pages.

Aspuru-Guztk et al., Photonic quantum simulators. Nature Physics. 2012;8:285-291. DOI: 10.1038/NPHYS2253.

Aspuru-Guzik et al., Simulated Quantum Computation of Molecular Energies. Science. 2005;309:1704-7.

Atabaki et al., Integrating photonics with silicon nanoelectronics for the next generation of systems on a chip. Nature. 2018;556(7701):349-354. 10 pages. DOI: 10.1038/s41586-018-0028-z.

Baehr-Jones et al., A 25 Gb/s Silicon Photonics Platform. arXiv:1203.0767. 2012. 11 pages.

Bao et al., Atomic-Layer Graphene as a Saturable Absorber for Ultrafast Pulsed Lasers. 24 pages. 2009.

Bao et al., Monolayer graphene as a saturable absorber in a mode-locked laser. Nano Research. 2011;4:297-307. DOI: 10.1007/s12274-010-0082-9.

Barahona, On the computational complexity of Ising spin glass models. Journal of Physics A: Mathematical and General. 1982;15:3241-3253.

Bertsimas et al., Robust optimization with simulated annealing. Journal of Global Optimization. 2010;48:323-334. DOI 10.1007/s10898-009-9496-x.

Bewick, Fast multiplication: algorithms and implementation. Ph.D. thesis, Stanford University (1994). 170 pages.

Bonneau et al., Quantum interference and manipulation of entanglement in silicon wire waveguide quantum circuits. New Journal of Physics. 2012;14:045003. 13 pages. DOI: 10.1088/1367-2630/14/4/045003.

(56) References Cited

OTHER PUBLICATIONS

Brilliantov, Effective magnetic Hamiltonian and Ginzburg criterion for fluids. Physical Review E. 1998;58:2628-2631.
Bromberg et al., Bloch oscillations of path-entangled photons. Physical Review Letters. 2010;105:263604-1-2633604-4. 4 pages. DOI: 10.1103/PhysRevLett.105.263604.
Bromberg et al., Quantum and Classical Correlations in Waveguide Lattices. Physical Review Letters. 2009;102:253904-1-253904-4. 4 pages. DOI: 10.1103/PhysRevLett.102.253904.
Broome et al., Photonic Boson Sampling in a Tunable Circuit. Science. 2012;339:794-8.
Bruck et al., On the power of neural networks for solving hard problems. American Institute of Physics. 1988. pp. 137-143. 7 pages.
Canziani et al., Evaluation of neural network architectures for embedded systems. Circuits and Systems (ISCAS). 2017 IEEE International Symposium. 4 pages.
Cardenas et al., Low loss etchless silicon photonic waveguides. Optics Express. 2009;17(6):4752-4757.
Carolan et al., Universal linear optics. Science. 2015;349:711-716.
Caves, Quantum-mechanical noise in an interferometer. Physical Review D. 1981;23(8):1693-1708. 16 pages.
Centeno et al., Optical bistability in finite-size nonlinear bidimensional photonic crystals doped by a microcavity. Physical Review B. 2000;62(12):R7683-R7686.
Chan, Optical flow switching networks. Proceedings of the IEEE. 2012;100(5):1079-1091.
Chen et al., Compact, low-loss and low-power 8×8 broadband silicon optical switch. Optics Express. 2012;20(17):18977-18985.
Chen et al., DianNao: A small-footprint high-throughput accelerator for ubiquitous machine-learning. ACM Sigplan Notices. 2014;49:269-283.
Chen et al., Efficient photon pair sources based on silicon-on-insulator microresonators. Proc. of SPIE. 2010;7815. 10 pages.
Chen et al., Frequency-bin entangled comb of photon pairs from a Silicon-on-Insulator micro-resonator. Optics Express. 2011;19(2):1470-1483.
Chen et al., Universal method for constructing N-port nonblocking optical router based on 2×2 optical switch for photonic networks-on-chip. Optics Express. 2014;22(10);12614-12627. DOI: 10.1364/OE.22.012614.
Cheng et al., In-Plane Optical Absorption and Free Carrier Absorption in Graphene-on-Silicon Waveguides. IEEE Journal of Selected Topics in Quantum Electronics. 2014;20(1). 6 pages.
Chetlur et al., cuDNN: Efficient primitives for deep learning. arXiv preprint arXiv:1410.0759. 2014. 9 pages.
Childs et al., Spatial search by quantum walk. Physical Review A. 2004;70(2):022314. 11 pages.
Chung et al., A monolithically integrated large-scale optical phased array in silicon-on-insulator cmos. IEEE Journal of Solid-State Circuits. 2018;53:275-296.
Cincotti, Prospects on planar quantum computing. Journal of Lightwave Technology. 2009;27(24):5755-5766.
Clements et al., Optimal design for universal multiport interferometers. Optica. 2016;3(12):1460-1465.
Crespi et al., Integrated multimode interferometers with arbitrary designs for photonic boson sampling. Nature Photonics. 2013;7:545-549. DOI: 10.1038/NPHOTON.2013.112.
Crespi, et al., Anderson localization of entangled photons in an integrated quantum walk. Nature Photonics. 2013;7:322-328. DOI: 10.1038/NPHOTON.2013.26.
Dai et al., Novel concept for ultracompact polarization splitter-rotator based on silicon nanowires. Optics Express. 2011;19(11):10940-9.
Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.
Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.
Esser et al., Convolutional networks for fast, energy-efficient neuromorphic computing. Proceedings of the National Academy of Sciences. 2016;113(41):11441-11446.
Farhat et al., Optical implementation of the Hopfield model. Applied Optics. 1985;24(10):1469-1475.
Feinberg et al., Making memristive neural network accelerators reliable. IEEE International Symposium on High Performance Computer Architecture (HPCA). 2018. pp. 52-65. DOI 10.1109/HPCA.2018.00015.
Fushman et al., Controlled Phase Shifts with a Single Quantum Dot. Science. 2008;320:769-772. DOI: 10.1126/science.1154643.
George et al., A programmable and configurable mixed-mode FPAA SoC. IEEE Transactions on Very Large Scale Integration (VLSI) Systems. 2016;24:2253-2261.
Gilmer et al., Neural message passing for quantum chemistry. arXiv preprint arXiv:1704.01212. Jun. 2017. 14 pages.
Golub et al., Calculating the singular values and pseudo-inverse of a matrix. Journal of the Society for Industrial and Applied Mathematics Series B Numerical Analysis. 1965;2(2):205-224.
Graves et al., Hybrid computing using a neural network with dynamic external memory. Nature. 2016;538. 21 pages. DOI:10.1038/nature20101.
Grote et al., First long-term application of squeezed states of light in a gravitational-wave observatory. Physical Review Letter. 2013;110:181101. 5 pages. DOI: 10.1103/PhysRevLett.110.181101.
Gruber et al., Planar-integrated optical vector-matrix multiplier. Applied Optics. 2000;39(29):5367-5373.
Gullans et al., Single-Photon Nonlinear Optics with Graphene Plasmons. Physical Review Letter. 2013;111:247401-1-247401-5. DOI: 10.1103/PhysRevLett.111.247401.
Gunn, CMOS photonics for high-speed interconnects. IEEE Micro. 2006;26:58-66.
Guo et al., Broadband wavelength conversion in a silicon vertical-dual slot waveguide. Optics Express. 2017;25(26):32964-71. 9 pages. DOI: 10.1364/OE.25.032964.
Haffner et al., Low-loss plasmon-assisted electro-optic modulator. Nature. 2018;556:483-486. 17 pages. DOI: 10.1038/s41586-018-0031-4.
Halasz et al., Phase diagram of QCD. Physical Review D. 1998;58:096007. 11 pages.
Hamerly et al., Scaling advantages of all-to-all connectivity in physical annealers: the Coherent Ising Machine vs. D-Wave 2000Q. arXiv preprints, May 2018. 17 pages.
Harris et al. Efficient, Compact and Low Loss Thermo-Optic Phase Shifter in Silicon. Optics Express. 2014;22(9);10487-93. DOI:10.1364/OE.22.010487.
Harris et al., Bosonic transport simulations in a large-scale programmable nanophotonic processor. arXiv:1507.03406. 2015. 8 pages.
Harris et al., Integrated source of spectrally filtered correlated photons for large-scale quantum photonic systems. Physical Review X. 2014;4:041047. 10 pages. DOI: 10.1103/PhysRevX.4.041047.
Harris et al., Quantum transport simulations in a programmable nanophotonic processor. Nature Photonics. 2017;11:447-452. DOI: 10.1038/NPHOTON.2017.95.
Hinton et al., Reducing the dimensionality of data with neural networks. Science. 2006;313:504-507.
Hochberg et al., Silicon Photonics: The Next Fabless Semiconductor Industry. IEEE Solid-State Circuits Magazine. 2013. pp. 48-58. DOI: 10.1109/MSSC.2012.2232791.
Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.
Hong et al., Measurement of subpicosecond time intervals between two photons by interference. Physical Review Letters. 1987;59(18):2044-2046.
Hopfield et al., Neural computation of decisions in optimization problems. Biological Cybernetics. 1985;52;141-152.

(56) References Cited

OTHER PUBLICATIONS

Hopfield, Neural networks and physical systems with emergent collective computational abilities. PNAS. 1982;79:2554-2558. DOI: 10.1073/pnas.79.8.2554.

Horowitz, Computing's energy problem (and what we can do about it). Solid-State Circuits Conference Digest of Technical Papers (ISSCC), 2014 IEEE International. 5 pages.

Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.

Humphreys et al., Linear Optical Quantum Computing in a Single Spatial Mode. Physical Review Letters. 2013;111:150501. 5 pages. DOI: 10.1103/PhysRevLett.111.150501.

Inagaki et al., Large-scale ising spin network based on degenerate optical parametric oscillators. Nature Photonics. 2016;10:415-419. 6 pages. DOI: 10.1038/NPHOTON.2016.68.

Isichenko, Percolation, statistical topography, and trans-port in random media. Reviews of Modern Physics. 1992;64(4):961-1043.

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated waveguides for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al., In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

Kardar et al., Dynamic Scaling of Growing Interfaces. Physical Review Letters. 1986;56(9):889-892.

Karpathy, CS231n Convolutional Neural Networks for Visual Recognition. Class notes. 2019. URL:http://cs231n.github.io/ 2 pages. [last accessed Sep. 24, 2019].

Keckler et al., GPUs and the future of parallel computing. IEEE Micro. 2011;31:7-17. DOI: 10.1109/MM.2011.89.

Kieling et al., On photonic Controlled Phase Gates. New Journal of Physics. 2010;12:0133003. 17 pages. DOI: 10.1088/1367-2630/12/1/013003.

Kilper et al., Optical networks come of age. Optics Photonics News. 2014;25:50-57. DOI: 10.1364/OPN.25.9.000050.

Kim et al., A functional hybrid memristor crossbar-array/cmos system for data storage and neuromorphic applications. Nano Letters. 2011;12:389-395.

Kirkpatrick et al., Optimization by simulated annealing. Science. 1983;220(4598):671-680.

Knill et al., A scheme for efficient quantum computation with linear optics. Nature. 2001;409(4652):46-52.

Knill et al., The Bayesian brain: the role of uncertainty in neural coding and computation. Trends in Neurosciences. 2004;27(12):712-719.

Knill, Quantum computing with realistically noisy devices. Nature. 2005;434:39-44.

Kok et al., Linear optical quantum computing with photonic qubits. Reviews of Modern Physics. 2007;79(1):135-174.

Koos et al., Silicon-organic hybrid (SOH) and plasmonic-organic hybrid (POH) integration. Journal of Lightwave Technology. 2016;34(2):256-268.

Krizhevsky et al., ImageNet classification with deep convolutional neural networks. Advances in Neural Information Processing Systems (NIPS). 2012. 9 pages.

Kucherenko et al., Application of Deterministic Low-Discrepancy Sequences in Global Optimization. Computational Optimization and Applications. 2005;30:297-318.

Kwack et al., Monolithic InP strictly non-blocking 8×8 switch for high-speed WDM optical interconnection. Optics Express. 2012;20(27):28734-41.

Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.

Lahini et al., Quantum Correlations in Two-Particle Anderson Localization. Physical Review Letters. 2010;105:163905. 4 pages. DOI: 10.1103/PhysRevLett.105.163905.

Laing et al., High-fidelity operation of quantum photonic circuits. Applied Physics Letters. 2010;97:211109. 5 pages. DOI: 10.1063/1.3497087.

Landauer, Irreversibility and heat generation in the computing process. IBM Journal of Research and Development. 1961. pp. 183-191.

Lanyon et al., Towards quantum chemistry on a quantum computer. Nature Chemistry. 2010;2:106-10. DOI: 10.1038/NCHEM.483.

Lawson et al., Basic linear algebra subprograms for Fortran usage. ACM Transactions on Mathematical Software (TOMS). 1979;5(3):308-323.

Lecun et al., Deep learning. Nature. 2015;521:436-444. DOI:10.1038/nature14539.

Lecun et al., Gradient-based learning applied to document recognition. Proceedings of the IEEE. Nov. 1998. 46 pages.

Levi et al., Hyper-transport of light and stochastic acceleration by evolving disorder. Nature Physics. 2012;8:912-7. DOI: 10.1038/NPHYS2463.

Li et al., Efficient and self-adaptive in-situ learning in multilayer memristor neural networks. Nature Communications. 2018;9:2385. 8 pages. doi: 10.1038/s41467-018-04484-2.

Lin et al., All-optical machine learning using diffractive deep neural networks. Science. 2018;361:1004-1008. 6 pages. doi: 10.1126/science.aat8084.

Little, The existence of persistent states in the brain. Mathematical Biosciences. 1974;19:101-120.

Liu et al., Nano-opto-electro-mechanical switch based on a four-waveguide directional coupler. Optics Express. 2017;25(9):10166-76. 11 pages.

Lu et al., 16×16 non-blocking silicon optical switch based on electro-optic Mach-Zehnder interferometers. Optics Express. 2016;24(9):9295-9307. doi: 10.1364/OE.24.009295.

Ma et al., Optical switching technology comparison: Optical mems vs. Other technologies. IEEE Optical Communications. 2003;41(11):S16-S23.

Macready et al., Criticality and Parallelism in Combinatorial Optimization. Science. 1996;271:56-59.

Marandi et al., Network of time-multiplexed optical parametric oscillators as a coherent Ising machine. Nature Photonics. 2014;8:937-942. doi: 10.1038/NPHOTON.2014.249.

Martin-Lopez et al., Experimental realization of Shor's quantum factoring algorithm using qubit recycling. Nature Photonics. 2012;6:773-6. DOI: 10.1038/NPHOTON.2012.259.

McMahon et al., A fully programmable 100-spin coherent Ising machine with all-to-all connections. Science. 2016;354(6312):614-7. DOI: 10.1126/science.aah5178.

Mead, Neuromorphic electronic systems. Proceedings of the IEEE. 1990;78(10):1629-1636.

Migdall et al., Tailoring single-photon and multiphoton probabilities of a single-photon on-demand source. Physical Review A. 2002;66:053805. 4 pages. DOI: 10.1103/PhysRevA.66.053805.

Mikkelsen et al., Dimensional variation tolerant silicon-on-insulator directional couplers. Optics Express. 2014;22(3):3145-50. DOI:10.1364/OE.22.003145.

Miller, Are optical transistors the logical next step? Nature Photonics. 2010;4:3-5.

(56) References Cited

OTHER PUBLICATIONS

Miller, Attojoule optoelectronics for low-energy information processing and communications. Journal of Lightwave Technology. 2017;35(3):346-96. DOI: 10.1109/JLT.2017.2647779.
Miller, Energy consumption in optical modulators for interconnects. Optics Express. 2012;20(52):A293-A308.
Miller, Perfect optics with imperfect components. Optica. 2015;2(8):747-750.
Miller, Reconfigurable add-drop multiplexer for spatial modes. Optics Express. 2013;21(17):20220-9. DOI:10.1364/OE.21.020220.
Miller, Self-aligning universal beam coupler, Optics Express. 2013;21(5):6360-70.
Miller, Self-configuring universal linear optical component [Invited]. Photonics Research. 2013;1(1):1-15. URL:http://dx.doi.org/10.1364/PRJ.1.000001.
Misra et al., Artificial neural networks in hardware: A survey of two decades of progress. Neurocomputing. 2010;74:239-255.
Mohseni et al., Environment-assisted quantum walks in photosynthetic complexes. The Journal of Chemical Physics. 2008;129:174106. 10 pages. DOI: 10.1063/1.3002335.
Moore, Cramming more components onto integrated circuits. Proceeding of the IEEE. 1998;86(1):82-5.
Mower et al., Efficient generation of single and entangled photons on a silicon photonic integrated chip. Physical Review A. 2011;84:052326. 7 pages. DOI: 10.1103/PhysRevA.84.052326.
Mower et al., High-fidelity quantum state evolution in imperfect photonic integrated circuits. Physical Review A. 2015;92(3):032322. 7 pages. doi: 10.1103/PhysRevA.92.032322.
Nagamatsu et al., A 15 NS 32×32-bit CMOS multiplier with an improved parallel structure. IEEE Custom Integrated Circuits Conference. 1989. 4 pages.
Najafi et al., On-Chip Detection of Entangled Photons by Scalable Integration of Single-Photon Detectors. arXiv:1405.4244. May 16, 2014. 27 pages.
Najafi et al., On-Chip detection of non-classical light by scalable integration of single-photon detectors. Nature Communications. 2015;6:5873. 8 pages. DOI: 10.1038/ncomms6873.
Naruse, Nanophotonic Information Physics. Nanointelligence and Nanophotonic Computing. Springer. 2014. 261 pages. DOI 10.1007/978-3-642-40224-1.
Nozaki et al., Sub-femtojoule all-optical switching using a photonic-crystal nanocavity. Nature Photonics. 2010;4:477-483. doi: 10.1038/NPHOTON.2010.89.
O'Brien et al., Demonstration of an all-optical quantum controlled-NOT gate. Nature. 2003;426:264-7.
Onsager, Crystal Statistics. I. A Two-Dimensional Model with an Order-Disorder Transition. Physical Review. 1944;65(3,4):117-149.
Orcutt et al., Nanophotonic integration in state-of-the-art CMOS foundries. Optics Express. 2011;19(3):2335-46.
Pelissetto et al., Critical phenomena and renormalization-group theory. Physics Reports. Apr. 2002. 150 pages.
Peng, Implementation of AlexNet with Tensorflow. https://github.com/ykpengba/AlexNet-A-Practical-Implementation. 2018. 2 pages. [last accessed Sep. 24, 2019].
Peretto, Collective properties of neural networks: A statistical physics approach. Biological Cybernetics. 1984;50:51-62.
Pernice et al., High-speed and high-efficiency travelling wave single-photon detectors embedded in nanophotonic circuits. Nature Communications 2012;3:1325. 10 pages. DOI: 10.1038/ncomms2307.
Peruzzo et al., Quantum walk of correlated photons. Science. 2010;329;1500-3. DOI: 10.1126/science.1193515.
Peters et al., Suspended photonic waveguide arrays for submicrometer alignment. SPIE 2014;9133(10):913317. 10 pages.
Politi et al., Integrated Quantum Photonics, IEEE Journal of Selected Topics in Quantum Electronics, 2009;5(6):1-12. DOI: 10.1109/JSTQE.2009.2026060.
Politi et al., Silica-on-Silicon Waveguide Quantum Circuits. Science. 2008;320:646-9. DOI: 10.1126/science.1155441.
Poon et al., Neuromorphic silicon neurons and large-scale neural networks: challenges and opportunities. Frontiers in Neuroscience. 2011;5:1-3. doi: 10.3389/fnins.2011.00108.
Prucnal et al., Recent progress in semiconductor excitable lasers for photonic spike processing. Advances in Optics and Photonics. 2016;8(2):228-299.
Psaltis et al., Holography in artificial neural networks. Nature. 1990;343:325-330.
Qiao et al., 16×16 non-blocking silicon electro-optic switch based on mach zehnder interferometers. Optical Fiber Communication Conference. Optical Society of America. 2016. 3 pages.
Ralph et al., Linear optical controlled-NOT gate in the coincidence basis. Physical Review A. 2002;65:062324-1-062324-5. DOI: 10.1103/PhysRevA.65.062324.
Ramanitra et al., Scalable and multi-service passive optical access infrastructure using variable optical splitters. Optical Fiber Communication Conference. Optical Society of America. 2005. 3 pages.
Raussendorf et al., A one-way quantum computer. Physical Review Letter. 2001;86(22):5188-91. DOI: 10.1103/PhysRevLett.86.5188.
Rechtsman et al., Photonic floquet topological insulators. Nature. 2013;496:196-200. doi: 10.1038/nature12066.
Reck et al., Experimental realization of any discrete unitary operator. Physical review letters. 1994;73(1):58-61. 6 pages.
Reed et al., Silicon optical modulators. Nature Photonics. 2010;4:518-26. DOI: 10.1038/NPHOTON.2010.179.
Rendl et al., Solving Max-Cut to optimality by intersecting semidefinite and polyhedral relaxations. Mathematical Programming. 2010;121:307-335. doi: 10.1007/s10107-008-0235-8.
Rios et al., Integrated all-photonic non-volatile multilevel memory. Nature Photonics. 2015;9:725-732. doi: 10.1038/NPHOTON.2015.182.
Rogalski, Progress in focal plane array technologies. Progress in Quantum Electronics. 2012;36:342-473.
Rohit et al., 8×8 space and wavelength selective cross-connect for simultaneous dynamic multi-wavelength routing. Optical Fiber Communication Conference. OFC/NFOEC Technical Digest. 2013. 3 pages.
Rosenblatt, The perceptron: a probabilistic model for information storage and organization in the brain. Psychological Review. 1958;65(6):386-408.
Russakovsky et al., ImageNet Large Scale Visual Recognition Challenge. arXiv:1409.0575v3. Jan. 2015. 43 pages.
Saade et al., Random projections through multiple optical scattering: Approximating Kernels at the speed of light. arXiv:1510.06664v2. Oct. 25, 2015. 6 pages.
Salandrino et al., Analysis of a three-core adiabatic directional coupler. Optics Communications. 2009;282:4524-6. doi:10.1016/j.optcom.2009.08.025.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997;14(11):2865-8.
Schmidhuber, Deep learning in neural networks: An overview. Neural Networks. 2015;61:85-117.
Schreiber et al., Decoherence and Disorder in Quantum Walks: From Ballistic Spread to Localization. Physical Review Letters. 2011;106:180403. 4 pages. DOI: 10.1103/PhysRevLett.106.180403.
Schwartz et al., Transport and Anderson localization in disordered two-dimensional photonic lattices. Nature. 2007;446:52-5. doi:10.1038/nature05623.
Selden, Pulse transmission through a saturable absorber. British Journal of Applied Physics. 1967;18:743-8.
Shafiee et al., ISAAC: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. DOI: 10.1038/NPHOTON.2017.93.
Shoji et al., Low-crosstalk 2×2 thermo-optic switch with silicon wire waveguides. Optics Express.2010;18(9):9071-5.

(56) References Cited

OTHER PUBLICATIONS

Silver et al. Mastering chess and shogi by self-play with a general reinforcement learning algorithm. arXiv preprint arXiv:1712.01815. 19 pages. 2017.

Silver et al., Mastering the game of go with deep neural networks and tree search. Nature. 2016;529:484-9. 20 pages. doi:10.1038/nature16961.

Silver et al., Mastering the game of Go without human knowledge. Nature. 2017;550:354-9. 18 pages. doi:10.1038/nature24270.

Silverstone et al., On-chip quantum interference between silicon photon-pair sources. Nature Photonics. 2014;8:104-8. DOI: 10.1038/NPHOTON.2013.339.

Smith et al., Phase-controlled integrated photonic quantum circuits. Optics Express. 2009;17(16):13516-25.

Soljacic et al., Optimal bistable switching in nonlinear photonic crystals. Physical Review E. 2002;66:055601. 4 pages.

Solli et al., Analog optical computing. Nature Photonics. 2015;9:704-6.

Spring et al., Boson sampling on a photonic chip. Science. 2013;339:798-801. DOI: 10.1126/science.1231692.

Srinivasan et al., 56 Gb/s germanium waveguide electro-absorption modulator. Journal of Lightwave Technology. 2016;34(2):419-24. DOI: 10.1109/JLT.2015.2478601.

Steinkraus et al., Using GPUs for machine learning algorithms. Proceedings of the 2005 Eight International Conference on Document Analysis and Recognition. 2005. 6 pages.

Suda et al., Quantum interference of photons in simple networks. Quantum Information Process. 2013;12:1915-45. DOI 10.1007/s11128-012-0479-3.

Sun et al., Large-scale nanophotonic phased array. Nature. 2013;493:195-9. doi:10.1038/nature11727.

Sun et al., Single-chip microprocessor that communicates directly using light. Nature. 2015;528:534-8. doi:10.1038/nature16454.

Suzuki et al., Ultra-compact 8×8 strictly-non-blocking Si-wire PILOSS switch. Optics Express. 2014;22(4):3887-94. DOI:10.1364/OE.22.003887.

Sze et al., Efficient processing of deep neural networks: A tutorial and survey. Proceedings of the IEEE. 2017;105(12):2295-2329. DOI: 10.1109/JPROC.2017.276174.

Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.

Tait et al., Broadcast and weight: An integrated network for scalable photonic spike processing. Journal of Lightwave Technology. 2014;32(21):3427-39. DOI: 10.1109/JLT.2014.2345652.

Tait et al., Chapter 8 Photonic Neuromorphic Signal Processing and Computing. Springer, Berlin, Heidelberg. 2014. pp. 183-222.

Tait et al., Neuromorphic photonic networks using silicon photonic weight banks. Scientific Reports. 2017;7:7430. 10 pages.

Tanabe et al., Fast bistable all-optical switch and memory on a silicon photonic crystal on-chip. Optics Letters. 2005;30(19):2575-7.

Tanizawa et al., Ultra-compact 32×32 strictly-non-blocking Si-wire optical switch with fan-out LGA interposer. Optics Express. 2015;23(13):17599-606. DOI:10.1364/OE.23.017599.

Thompson et al., Integrated waveguide circuits for optical quantum computing. IET Circuits, Devices, & Systems. 2011;5(2):94-102. doi: 10.1049/iet-cds.2010.0108.

Timurdogan et al., An ultralow power athermal silicon modulator. Nature Communications. 2014;5:4008. 11 pages. DOI: 10.1038/ncomms5008.

Vandoorne et al., Experimental demonstration of reservoir computing on a silicon photonics chip. Nature Communications. 2014;5:3541. 6 pages. DOI: 10.1038/ncomms4541.

Vazquez et al., Optical NP problem solver on laser-written waveguide plat-form. Optics Express. 2018;26(2):702-10.

Vivien et al., Zero-bias 40gbit/s germanium waveguide photodetector on silicon. Optics Express. 2012;20(2):1096-1101.

Wang et al., Coherent Ising machine based on degenerate optical parametric oscillators. Physical Review A. 2013;88:063853. 9 pages. DOI: 10.1103/PhysRevA.88.063853.

Wang et al., Deep learning for identifying metastatic breast cancer. arXiv preprint arXiv:1606.05718. Jun. 18, 2016. 6 pages.

Werbos, Beyond regression: New tools for prediction and analysis in the behavioral sciences. Ph.D. dissertation, Harvard University. Aug. 1974. 454 pages.

Whitfield et al., Simulation of electronic structure Hamiltonians using quantum computers. Molecular Physics. 2010;109(5,10):735-50. DOI: 10.1080/00268976.2011.552441.

Wu et al., An optical fiber network oracle for NP-complete problems. Light: Science & Applications. 2014;3: e147. 5 pages. doi:10.1038/lsa.2014.28.

Xia et al., Mode conversion losses in silicon-on-insulator photonic wire based racetrack resonators. Optics Express. 2006;14(9):3872-86.

Xie et al., Terahertz integrated device: high-Q silicon dielectric resonators. Optical Materials Express. 2017;8(1):50-8. 9 pages.

Xu et al., Experimental observations of bistability and instability in a two-dimensional nonlinear optical superlattice. Physical Review Letters. 1993;71(24):3959-62.

Yang et al., Non-Blocking 4×4 Electro-Optic Silicon Switch for On-Chip Photonic Networks. Optics Express 2011;19(1):47-54.

Yao et al., Serial-parallel multipliers. Proceedings of 27th Asilomar Conference on Signals, Systems and Computers. 1993. pp. 359-363.

Young et al., Recent trends in deep learning based natural language processing. IEEE Computational Intelligence Magazine. arXiv:1708.02709v8. Nov. 2018. 32 pages.

Zhou et al., Calculating Unknown Eigenvalues with a Quantum Algorithm. Nature Photonics. 2013;7:223-8. DOI: 10.1038/NPHOTON.2012.360.

\* cited by examiner

HIGH-EFFICIENCY MULTI-SLOT WAVEGUIDE NANO-OPTO-ELECTROMECHANICAL PHASE MODULATOR

CROSS-REFERENCE TO RELATED APPLICATIONS

This application is a Continuation claiming the benefit under 35 U.S.C. § 120 of U.S. patent application Ser. No. 16/411,476, entitled "HIGH-EFFICIENCY MULTI-SLOT WAVEGUIDE NANO-OPTO-ELECTROMECHANICAL PHASE MODULATOR," filed on May 14, 2019, which is hereby incorporated herein by reference in its entirety.

U.S. patent application Ser. No. 16/411,476 claims the benefit under 35 U.S.C. § 119(e) to U.S. Provisional Application Ser. No. 62/792,720, entitled "HIGH-EFFICIENCY DOUBLE-SLOT WAVEGUIDE NANO-OPTOELECTRO-MECHANICAL PHASE MODULATOR," filed on Jan. 15, 2019, which is hereby incorporated herein by reference in its entirety.

BACKGROUND

Phase modulators are optical devices designed to vary the phase of optical signals. In phase modulators, phase changes can be achieved by varying the refractive index of a material. Examples of mechanism for achieving refractive index variations include the free-carrier plasma dispersion and the thermo-optic effect. The free-carrier plasma dispersion effect is related to the density of free carriers in a semiconductor, which causes changes both in the real and imaginary parts of the refractive index. Hence, phase modulation can be achieved by carrier injection or depletion. The thermo-optic effect is related to changes in the refractive index of a material responsive to temperature changes. Typical thermo-optic phase modulators include doped semiconductor regions, in which a temperature rise results from the passage of electric charges.

SUMMARY OF THE DISCLOSURE

Some embodiments relate to a photonic apparatus comprising a substrate; an input optical waveguide formed on the substrate; and a suspended multi-slot optical structure optically coupled to the input optical waveguide.

In some embodiments, the suspended multi-slot optical structure comprises first, second and third optical waveguides arranged to form a first slot between the first optical waveguide and the second optical waveguide and a second slot between the second optical waveguide and the third optical waveguide.

In some embodiments, the first, second and third optical waveguides are co-planar.

In some embodiments, the first slot is sized to support more optical energy than the third optical waveguide.

In some embodiments, the first slot has a width that is equal to or less than 200 nm.

In some embodiments, the first slot has a width that is equal to or less than 100 nm.

In some embodiments, the second optical waveguide is contiguous with the input waveguide.

In some embodiments, the second optical waveguide is tapered such that the width of the second waveguide is equal to a width of the input waveguide at a distal end of the suspended multi-slot optical structure and the width of the second waveguide is less than a width of the input waveguide at a center of the suspended multi-slot optical structure.

In some embodiments, the suspended multi-slot optical structure is surrounded by air.

In some embodiments, the suspended multi-slot optical structure is free to oscillate in the air relative to the substrate.

In some embodiments, the suspended multi-slot optical structure is free to oscillate in a direction perpendicular to a propagation axis of the suspended multi-slot optical structure.

In some embodiments, the photonic apparatus further comprises a lower cladding formed on the substrate and an undercut formed through a portion of the lower cladding between the substrate and the suspended multi-slot optical structure.

In some embodiments, the lower cladding is not in contact with the suspended multi-slot optical structure.

In some embodiments, the photonic apparatus further comprises an upper cladding formed on the lower cladding and a trench formed through a portion of the upper cladding, wherein the suspended multi-slot optical structure is disposed in the trench.

In some embodiments, at least a portion of the input optical waveguide rests on the lower cladding.

In some embodiments, the suspended multi-slot optical structure is made of a material having a doping concentration less than $10^{14}$ cm$^{-3}$.

In some embodiments, the suspended multi-slot optical structure is made of an undoped material.

Some embodiments relate to an optical phase shifter comprising a substrate; an input optical waveguide formed on the substrate; an output optical waveguide formed on the substrate; and a multi-slot optical structure optically coupling the input optical waveguide to the output optical waveguide and forming first and second slots.

In some embodiments, the multi-slot optical structure comprises first, second and third optical waveguides, the first slot being formed between the first and second optical waveguides and the second slot being formed between the second and third optical waveguides.

In some embodiments, the mechanical structure is attached to the first and third optical waveguides.

In some embodiments, motion of the mechanical structure causes a variation in a width of the first slot and/or a variation in a width of the second slot.

In some embodiments, the multi-slot optical structure has a length that is less than or equal to 50 µm.

In some embodiments, the multi-slot optical structure has a length that is less than or equal to 30 µm.

In some embodiments, the multi-slot optical structure is suspended.

In some embodiments, the optical phase shifter further comprises a lower cladding formed on the substrate and an undercut formed through a portion of the lower cladding between the substrate and the multi-slot optical structure.

In some embodiments, the lower cladding is not in contact with the multi-slot optical structure.

In some embodiments, the optical phase shifter further comprises an upper cladding formed on the lower cladding and a trench formed though a portion of the upper cladding, wherein the multi-slot optical structure is disposed in the trench.

In some embodiments, the optical phase shifter further comprises a mechanical structure connecting the multi-slot optical structure to a mechanical driver.

Some embodiments relate to a method for shifting a phase of an optical signal, the method comprising providing the optical signal to a multi-slot optical structure formed on a substrate and having first and second slots; exciting a multi-slot optical mode defined in the multi-slot optical structure; and varying a width of the first slot and/or a width of the second slot over time.

In some embodiments, at least 50% of an energy of the multi-slot mode is within the first and second slots.

In some embodiments, varying a width of the first slot and/or a width of the second slot over time comprises applying a mechanical force to the multi-slot optical structure via a mechanical structure.

In some embodiments, the multi-slot optical structure comprises first, second and third optical waveguides, wherein the first slot is formed between the first and second optical waveguides and the second slot is formed between the second and third optical waveguides, and wherein applying a mechanical force to the multi-slot optical structure comprises applying a mechanical force to the first optical waveguide and the third optical waveguide.

Some embodiments relate to a method for fabricating a photonic apparatus, the method comprising obtaining a chip having a substrate, a lower cladding layer formed on the substrate, a semiconductor layer formed on the lower cladding layer and an upper cladding layer formed on the semiconductor layer; patterning the semiconductor layer to form a multi-slot optical structure having first and second slots; forming a trench in the upper cladding layer to expose the multi-slot optical structure to air; and forming an undercut in the lower cladding layer to suspend at least a portion of the multi-slot optical structure in air.

In some embodiments, patterning the semiconductor layer to form the multi-slot optical structure comprises patterning the semiconductor layer to form first, second and third optical waveguides, the first slot being disposed between the first and second optical waveguides and the second slot being disposed between the second and third optical waveguides.

In some embodiments, forming the trench in the upper cladding layer comprises performing a reactive ion etch through the upper cladding layer.

In some embodiments, forming the undercut in the lower cladding layer comprises performing an isotropic etch through the lower cladding layer.

Some embodiments relate to a nano-opto-electro-mechanical System (NOEMS) phase shifter comprising: a plurality of non-conductive waveguides suspended in a trench.

In some embodiments, each of the plurality of non-conductive waveguides has a resistivity greater than 1300 Ωcm.

In some embodiments, adjacent waveguides of the plurality of non-conductive waveguides are separated from each other by less than 200 nm.

In some embodiments, the NOEMS phase shifter further comprises a mechanical driver configured to cause oscillation of at least some of the plurality of non-conductive waveguides.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
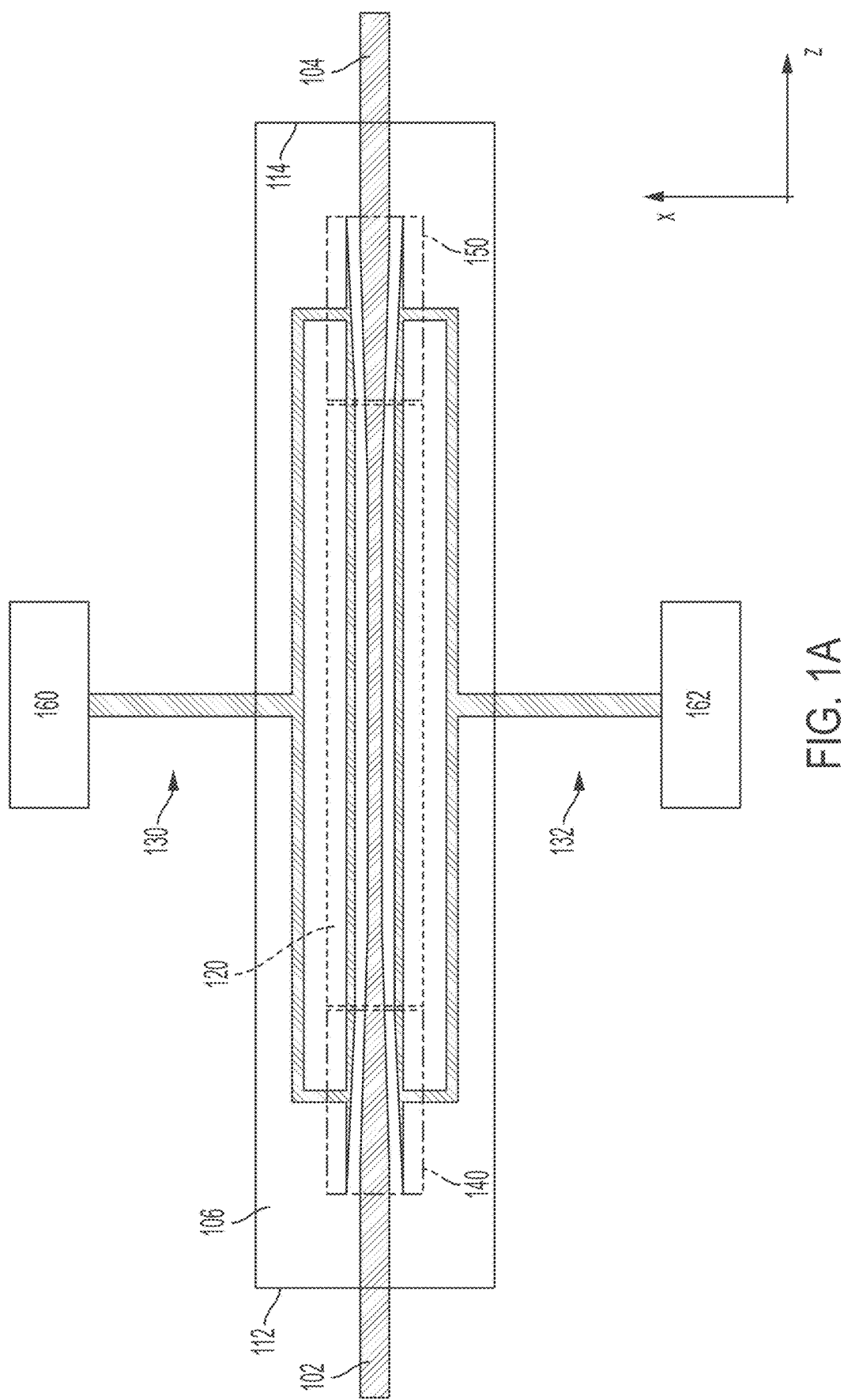
FIG. 1A is a top view illustrating schematically a Nano-Opto-Electromechanical Systems (NOEMS) phase modulator, in accordance with some non-limiting embodiments.

The inventors have recognized and appreciated that certain optical phase modulators suffer from high dynamic loss and low modulation speed, which significantly limit the range of applications in which these phase modulators can be deployed. More specifically, some phase modulators involve significant trade-offs between modulation speed and dynamic loss, such that an increase in modulation speed results in an increase in dynamic loss. As used herein, the phrase "dynamic loss" refers to optical power loss experienced by an optical signal that depends on the degree to which its phase is modulated. Ideal phase modulators are such that power loss is independent of the phase modulation. Real-world phase modulators, however, experience a certain power loss when no modulation occurs, and experience a different power loss when modulation occurs. For example, the power loss experienced at no phase modulation may be $L_1$, the power loss experienced at a $\pi/2$-phase modulation may be $L_2$, and the power loss experienced at a $\pi$-phase modulation may be $L_3$, with $L_1$, $L_2$ and $L_3$ being different from each other. This behavior is undesirable because, in addition to phase modulation, the signal further experiences amplitude modulation.

Some such phase modulators, in addition, require several hundreds of microns in length to provide sufficiently large phase shifts. Unfortunately, being so long, such phase modulators are not suitable for use in applications requiring integration of several phase shifters on a single chip. The phase modulators alone may take up most of the space available on the chip, thus limiting the number of devices that can be co-integrated on the same chip.

Recognizing the aforementioned limitations of certain phase modulators, the inventors have developed small footprint-optical phase modulators capable of providing high modulation speeds (e.g., in excess of 100 MHz or 1 GHz) while limiting dynamic loss. In some embodiments, a phase modulator may occupy an area as small as 300 µm². Thus, as an example, a reticle having an area of 1 cm² can accommodate as many as 15,000 phase modulators while saving an additional 50 mm² for other devices.

Some embodiments relate to Nano-Opto-Electromechanical Systems (NOEMS) phase modulators having multiple suspended optical waveguides positioned adjacent to one another and forming a plurality of slots therebetween. The dimensions of the slots are sufficiently small to form slot waveguides, whereby a substantial portion (e.g., a majority) of the mode energy is confined in the slots themselves. These modes are referred to herein as slot modes. Having a substantial portion of the mode energy in the slots enables modulation of the effective index of the mode, and a result, of the phase of an optical signal embodying the mode, by causing variations in the dimensions of the slots. In some embodiments, phase modulation can be achieved by applying mechanical forces that cause variations in the dimensions of the slots.

The inventors have recognized and appreciated that the modulation speed achievable with the NOEMS phase modulators described herein can be increased, without significant increases in dynamic loss, by decoupling the mechanical drivers from the region where optical modulation takes place. In phase modulators in which the mechanical drivers are decoupled from the optical modulation region, electric driving signals are applied on the mechanical drivers, rather than being applied on the optical modulation region itself. This arrangement removes the need to make the optical modulation region electrically conductive, thus enabling a reduction in the doping of this region. The low doping results in a reduction of free carriers which may otherwise lead to optical absorption, thus lowering dynamic loss.

Furthermore, decoupling the mechanical drivers from the optical modulation region enables a greater modulation per unit length, and as a result a shorter modulation region. Shorter modulation regions, in turn, enable, greater modulation speed.

The inventors have further recognized and appreciated that including multiple slots in the modulation region can enable a further reduction in the length of the phase modulator (thereby decreasing its size). Having more than one slot, in fact, enables a substantial reduction in the length of the transition region through which light is coupled to the modulation region. The result is a substantially more compact form factor. Thus, NOEMS phase modulators of the types described herein can have shorter modulation regions and/or shorter transition regions. Phase modulators of the types described herein can have lengths as low as 20 µm or 30 µm, in some embodiments.

As will be described in detail further below, some embodiments relate to phase modulators in which a trench is formed in the chip, and is arranged so that the modulating waveguides are suspended in air and are free move in space.

The inventors have recognized a potential drawback associated with the use of trenches that results from the formation of cladding/air interfaces. When a propagating optical signal enters (or exits) a trench, it encounters a cladding/air interface (or an air/cladding interface). Unfortunately, the presence of the interface can give rise to optical reflections, which in turn can increase insertion losses. The inventors have appreciated that the negative effect of such interfaces can be mitigated by reducing the physical extension of the optical mode in the region where it passes through the interface. This can be achieved in various ways. For example, in some embodiments, the extension of the optical mode may be reduced by tightly confining the mode within a rib waveguide. A rib waveguide may be sized so that only a small fraction of the mode energy (e.g., less than 20%, less than 10%, or less than 5%) is outside the edges of the waveguide.

NOEMS phase modulators of the types described herein may be used in a variety of applications, including for example in telecom and datacom (including local area networks, metropolitan area networks, wide area networks, data center networks, satellite networks, etc.), analog applications such as radio-over-fiber, all-optical switching, coherent Lidar, phased arrays, coherent imaging, machine learning and other types of artificial intelligence applications. Additionally, the NOEMS modulators may be used as part of amplitude modulators, for example if combined with a Mach Zehnder modulator. For example, a Mach Zehnder modulator may be provided in which a NOEMS phase modulator is positioned in one or more of the arms of the Mach Zehnder modulator. Several modulation schemes may be enabled using NOEMS phase modulators, including for example amplitude shift keying (ASK), quadrature amplitude modulation (QAM), phase shift keying (BPSK), quadrature phase shift keying (QPSK) and higher order QPSK, offset quadrature phase-shift keying (OQPSK), Dual-polarization quadrature phase shift keying (DPQPSK), amplitude phase shift keying (APSK), etc. Additionally, NOEMS phase modulators may be used as phase correctors in applications in which the phase of an optical signal tends to drift unpredictably. In some embodiments, NOEMS phase modulators of the types described herein may be used as part of a photonic processing system.

FIG. 1A is a top view illustrating schematically a Nano-Opto-Electromechanical Systems (NOEMS) phase modulator, in accordance with some non-limiting embodiments. NOEMS phase modulator 100 includes input waveguide 102, output waveguide 104, input transition region 140, output transition region 150, suspended multi-slot optical structure 120, mechanical structures 130 and 132, and mechanical drivers 160 and 162. NOEMS phase modulator 100 may be fabricated using silicon photonic techniques. For example, NOEMS phase modulator 100 may be fabricated on a silicon substrate, such as a bulk silicon substrate or a silicon-on-insulator (SOI) substrate. In some embodiments, NOEMS phase modulator 100 may further include electronic circuitry configured to control the operations of mechanical drivers 160 and 162. The electronic circuitry may be fabricated on the same substrate hosting the components of FIG. 1A, or on a separate substrate. When disposed on a separate substrate, the substrates may be bonded to one another in a any suitable way, including 3D-bonding, flip-chip bonding, wire bonding etc.

At least part of NOEMS phase modulator 100 is formed in a trench 106. As will be described in detail further below, trenches of the types described herein may be formed by etching a portion of the cladding. In the example of FIG. 1A, trench 106 has a rectangular shape, though trenches of any other suitable shape may be used. In this example, trench 106 has four sidewalls. Sidewalls 112 and 114 are spaced from one another along the z-axis (referred to herein as the propagation axis), and the other two sidewalls (not labeled in FIG. 1A) are spaced from one another along the x-axis.

In some embodiments, the separation along the z-axis between sidewalls 112 and 114 may be less than or equal to 50 μm, less than or equal to 30 μm, or less than or equal to 20 μm. Thus, the modulation region of this NOEMS phase modulator is significantly shorter than other types of phase modulators, which require several hundreds of microns for modulating the phase of an optical signal. The relatively short length is enable by one or more of the following factors. First, having multiple slots improves coupling to the optical modulation region, which in turn enables a reduction in the length of the transition region. The improved coupling may be the result of enhanced mode symmetry in the multi-slot structure. Second, decoupling the mechanical drivers from the optical modulation region enables a greater modulation per unit length, and as a result a shorter modulation region.

During operation, an optical signal may be provided to input waveguide 102. In one example, the optical signal may be a continuous wave (CW) signal. Phase modulation may take place in suspended multi-slot optical structure 120. A phase modulated optical signal may exit NOEMS phase modulator 100 from output waveguide 104. Transition region 140 may ensure loss-free or nearly loss-free optical coupling between input waveguide 102 and suspended multi-slot optical structure 120. Similarly, transition region 150 may ensure loss-free or nearly loss-free optical coupling between suspended multi-slot optical structure 120 and output waveguide 104. Transitions regions 140 and 150 may include tapered waveguides in some embodiments, as described in detail further below. As discussed above, the length of the transitions regions may be shorter relative to other implementations.

The input optical signal may have any suitable wavelength, including but not limited to a wavelength in the O-band, E-band, S-band, C-band or L-band. Alternatively, the wavelength may be in the 850 nm-band or in the visible band. It should be appreciated that NOEMS phase modulator 100 may be made of any suitable material, so long as the material is transparent or at least partially transparent at the wavelength of interest, and the refractive index of the core region is greater than the refractive index of the surrounding cladding. In some embodiments, NOEMS phase modulator 100 may be made of silicon. For example, input waveguide 102, output waveguide 104, input transition region 140, output transition region 150, suspended multi-slot optical structure 120, and mechanical structures 130 and 132 may be made of silicon. Given silicon's relatively low optical bandgap (approximately 1.12 eV), silicon may be particularly suitable for use in connection with near infrared wavelengths. In another example, NOEMS phase modulator 100 may be made of silicon nitride or diamond. Given silicon nitride's and diamond's relatively high optical bandgaps (approximately 5 eV and approximately 5.47 eV, respectively), these materials may be particularly suitable for use in connection with visible wavelengths. However, other materials are also possible, including indium phosphide, gallium arsenide, and or any suitable III-V or II-VI alloy.

In some embodiments, input waveguide 102 and output waveguide 104 may be sized to support a single mode at the wavelength of operation (though multi-mode waveguides can also be used). For example, if a NOEMS phase modulator is designed to operate at 1550 nm (though of course, not all embodiments are limited in this respect), input and output waveguides 102 and 104 may support a single mode at 1550 nm. In this way, the mode confinement within the waveguide may be enhanced, thus reducing optical losses due to scattering and reflections. Waveguides 102 and 104 may be rib waveguides (e.g., with rectangular cross sections) or may have any other suitable shape.

As described above, part of NOEMS phase modulator 100 may be formed within a trench 106, so that the waveguides in the modulation region are surrounded by air and are free to move in space. The drawback of including a trench is the formation of a cladding/air interface and an air/cladding interface along the propagation path. Thus, the input optical signal passes a cladding/air interface (in correspondence with sidewall 112) before reaching the region where modulation occurs and passes an air/cladding interface (in correspondence with sidewall 114) after the modulation region. These interfaces may introduce reflection losses. In some embodiments, reflection losses may be reduced by positioning transition region 140 inside, rather than outside, trench 106 (as shown in FIG. 1A). In this way, the mode expansion associated with the transition region takes place where the optical signal has already passed the cladding/air interface. In other words, the mode is tightly confined as it passes the cladding/air interface, but is expanded in the trench, using the transition region, for purposes of coupling to the suspended multi-slot structure 120. Similarly, transition region 150 may be formed inside trench 106, thereby spatially re-confining the mode before it reaches sidewall 114.

Figure 1B:
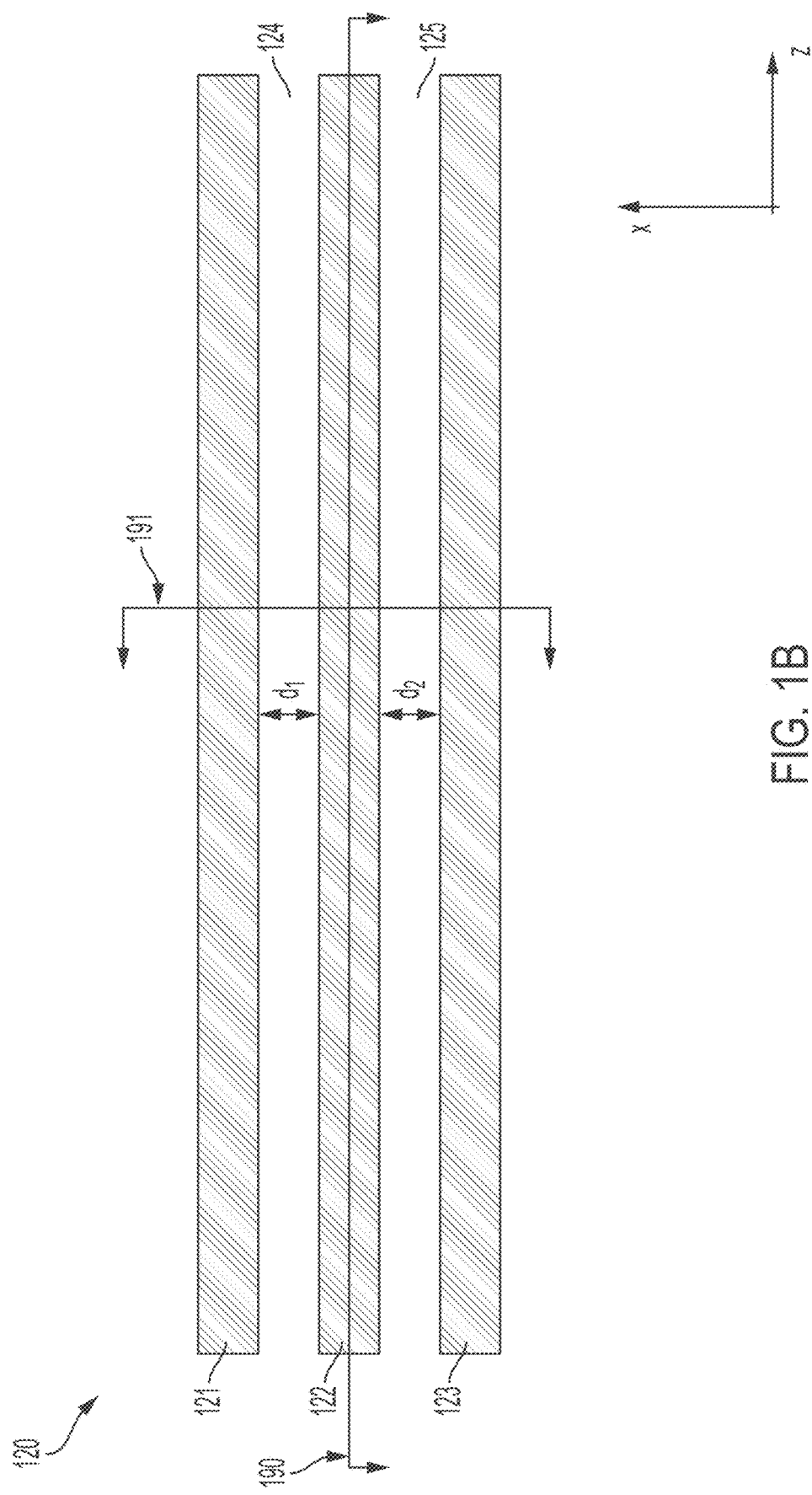
FIG. 1B is a top view illustrating schematically a suspended multi-slot optical structure of the NOEMS phase modulator of FIG. 1A, in accordance with some non-limiting embodiments.

FIG. 1B illustrates suspended multi-slot optical structure 120 in additional detail, in accordance with some non-limiting embodiments. In the example of FIG. 1B, multi-slot optical structure 120 includes three waveguides (121, 122 and 123). Slot 124 separates waveguide 121 from waveguide 122 and slot 125 separates waveguide 122 from waveguide 123. The width of the slots ($d_1$ and $d_2$) may be less than the critical width (at the wavelength of operation) for forming slot modes, whereby a substantial portion of the mode energy (e.g., more than 40%, more than 50%, more than 60%, or more than 75%) is within the slots. For example, each of $d_1$ and $d_2$ may be equal to or less than 200 nm, equal to or less than 150 nm, or equal to or less than 100 nm. The minimum width may be set by the photolithographic resolution.

Figure 1C:
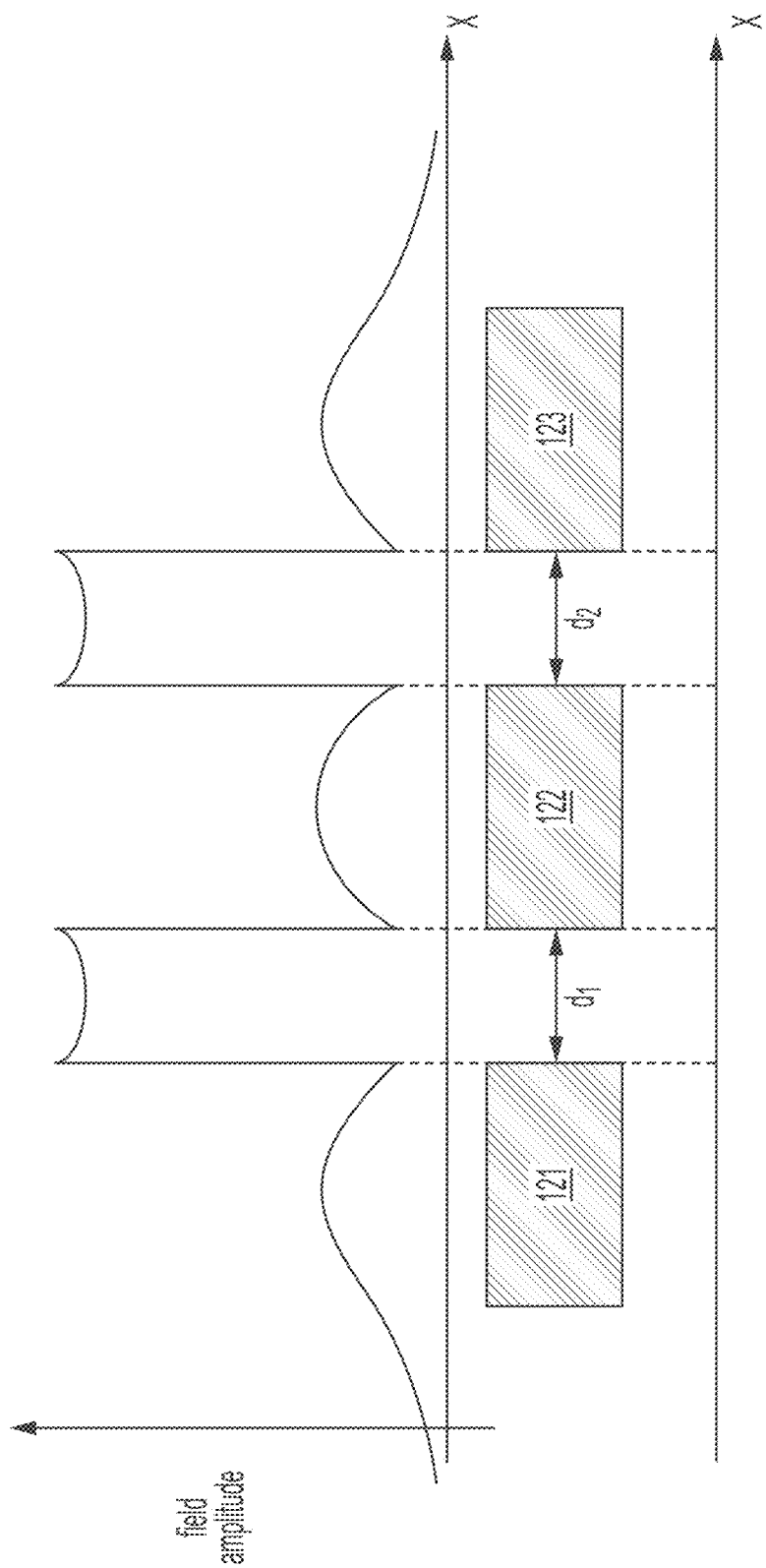
FIG. 1C is a plot illustrating an example of an optical mode arising in the suspended multi-slot optical structure of FIG. 1B, in accordance with some non-limiting embodiments.

FIG. 1C is a plot illustrating an example of an optical mode supported by the waveguides 121, 122 and 123, in accordance with some non-limiting embodiments. More specifically, the plot illustrates the amplitude of a mode (e.g., the electric field $E_x$, $E_y$ or $E_z$, or magnetic field $H_x$, $H_y$ or $H_z$). As illustrated, a substantial portion of the overall energy is confined within the slots, where the mode exhibits peaks of amplitude. In some embodiments, there is more optical energy in one of the slots than in any one of the individual waveguides. In some embodiments, there is more optical energy in one of the slots than in all the waveguides considered together. Outside the outer walls of the exterior waveguides, the mode energy decays (for example exponentially).

Widths $d_1$ and $d_2$ may be equal to, or different than, one another. The widths of the slots and the waveguides may be constant along the z-axis (as in FIG. 1B) or may vary. In some embodiments, the widths of waveguides 121, 122 and 123 may be less than the width of input waveguide 102. In some embodiments, when the wavelength of operation is in the C-band, the widths of waveguides 121, 122 and 123 may be between 200 nm and 400 nm, between 250 nm and 350 nm, or within any other suitable range, whether within or outside such ranges.

While the example of FIG. 1B illustrates suspended a multi-slot optical structure 120 with three waveguides and two slots, any other suitable number of waveguides and slots may be used. In other examples, a suspended multi-slot optical structure 120 may include five waveguides and four slots, seven waveguides and six slots, nine waveguides and eight slots, etc. In some embodiments, the structure includes an odd number of waveguides (and consequently, an even number of slots) so that only symmetric modes are excited, while antisymmetric modes remain unexcited. The inventors have appreciated that enhancing the symmetry of the mode enhances coupling into the slotted structure, thus enabling a substantial reduction in the length of the transition region. However, implementations with even number of waveguides are also possible.

As will be described in detail further below, phase modulation occurs by causing the exterior waveguides (121 and 123 in FIG. 1B) to move relative to the center waveguide (122 in FIG. 1B) along the x-axis. When waveguide 121 moves in the x-axis relative to waveguide 122, the width of slot 124 varies, and the shape of the mode supported by the structure varies accordingly. The result is a change in the effective index of the mode supported by the structure, and consequently, a phase modulation takes place. Motion of the exterior waveguides may be induced using mechanical structures 130 and 132.

Figure 1D:
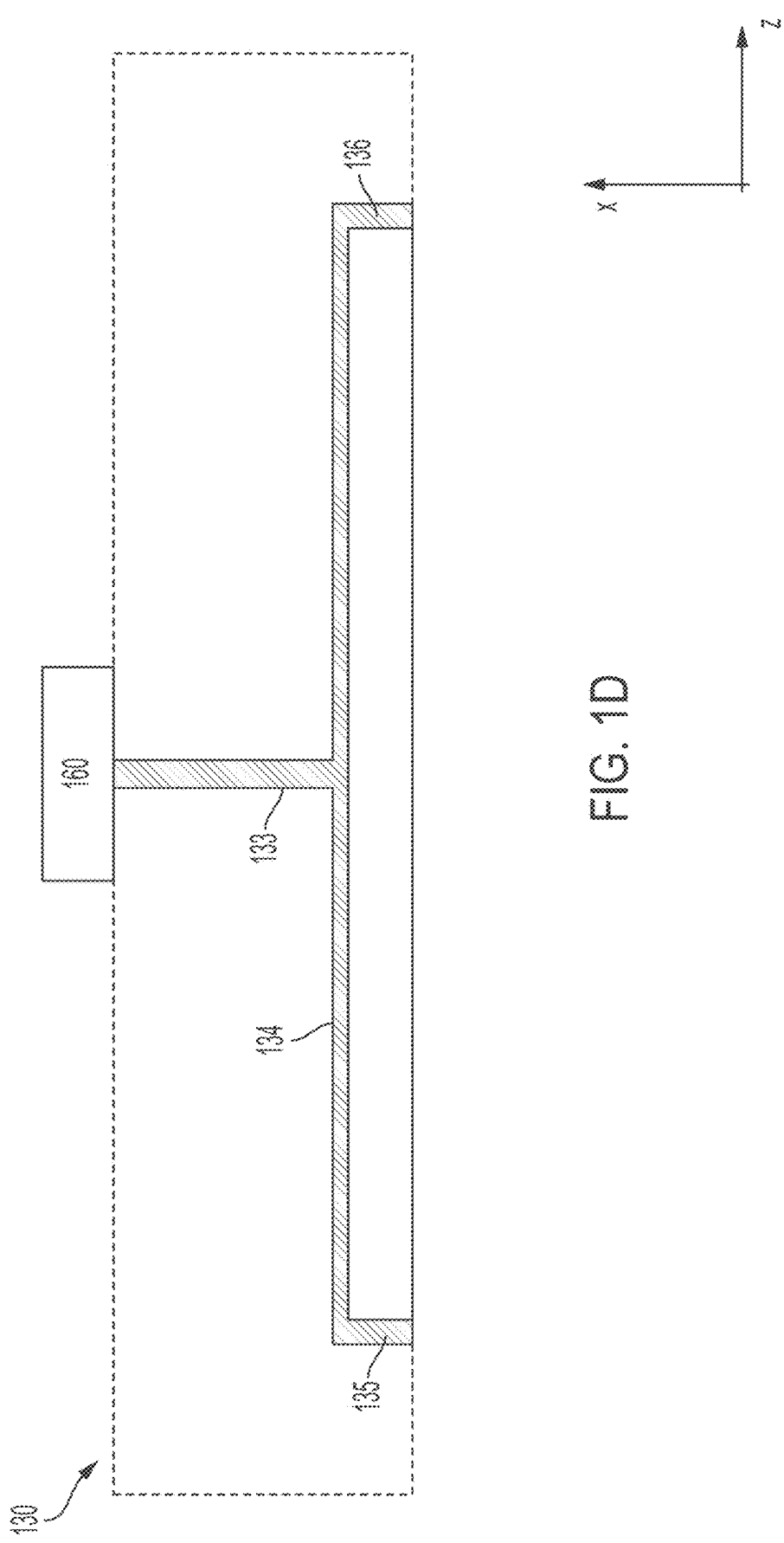
FIG. 1D is a top view illustrating schematically a mechanical structure of the NOEMS phase modulator of FIG. 1A, in accordance with some non-limiting embodiments.
Figure 1E:
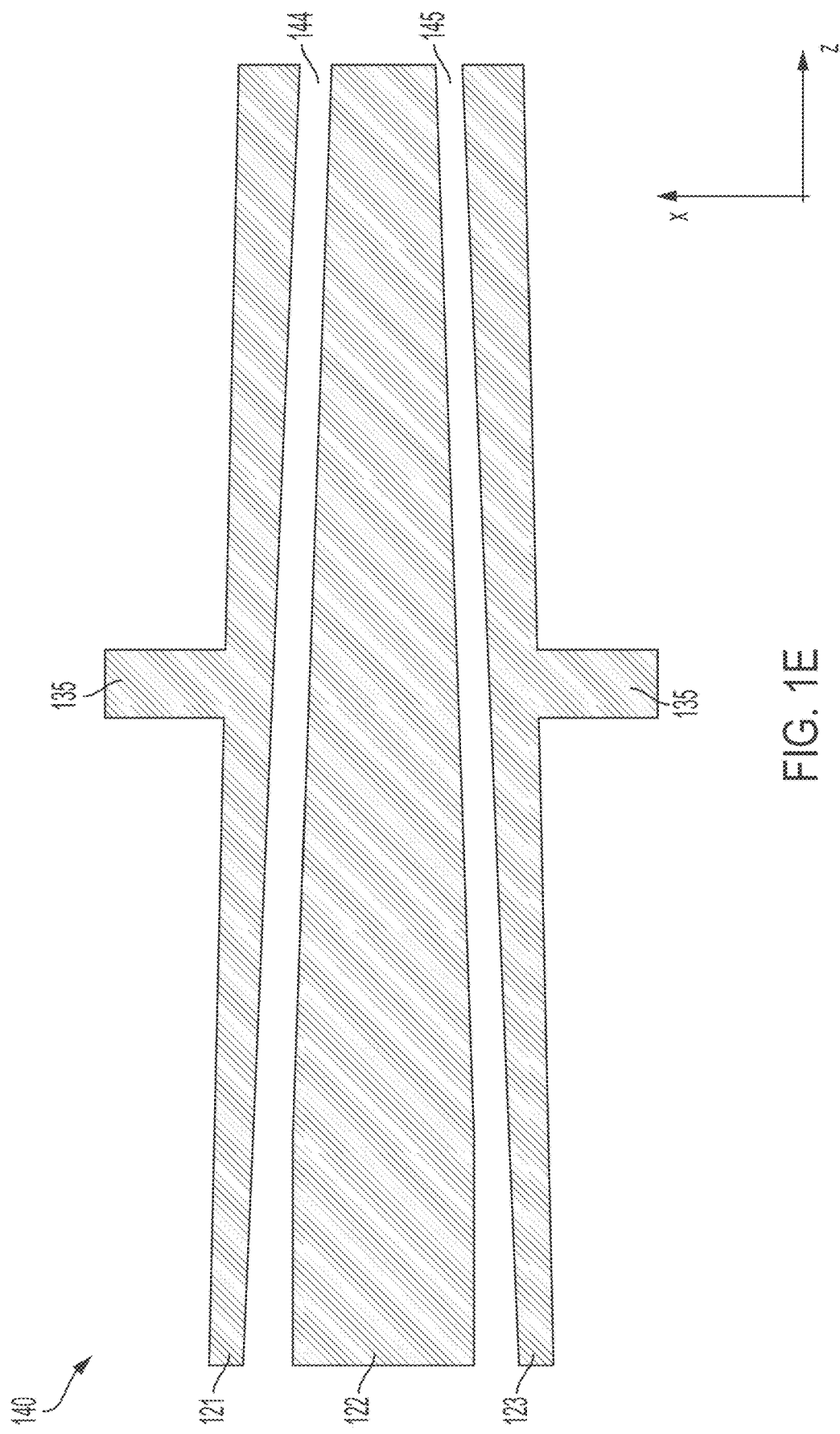
FIG. 1E is a top view illustrating schematically a transition region of the NOEMS phase modulator of FIG. 1A, in accordance with some non-limiting embodiments.

An example of a mechanical structure 130 is illustrated in FIG. 1D, in accordance with some non-limiting embodiments. Mechanical structure 132 (see FIG. 1A) may have a similar arrangement. In the example of FIG. 1D, mechanical structure 130 includes beams 133, 134, 135 and 136. Beam 133 connects mechanical driver 160 to beam 134. Beams 135 and 136 connect beam 134 to the exterior waveguide. To limit optical losses, beams 135 and 136 may be attached to the exterior waveguide in the transition regions 140 and 150, respectively, rather than in the modulation region (as shown in FIG. 1E, which is discussed below). However, attaching beams 135 and 136 to the exterior waveguide to the modulation region is also possible. Beams with different shapes, sizes and orientations may be used in alternative or in addition to those illustrated in FIG. 1D.

Mechanical structure 130 may transfer mechanical forces generated at mechanical driver 160 to waveguide 121, thereby causing waveguide 121 to move relative to waveguide 122. Mechanical drivers 160 and 162 may be implemented in any suitable way. In one example, the mechanical drivers may include piezoelectric devices. In one example, the mechanical drivers may include conductive fingers. When a voltage is applied between adjacent fingers, the fingers may experience acceleration, thus imparting a mechanical force to the mechanical structures. In some embodiments, the mechanical drivers may be driven with an electrical signal having a pattern encoded thereon. In this way, modulation results in the pattern being imparted onto the phase of an input optical signal.

It should be appreciated that, because the waveguides of suspended multi-slot optical structure 120 are driven using external mechanical drivers, rather than being directly supplied with electrical signals as in certain conventional phase modulators, the conductivity of the waveguides can be relaxed, thus reducing free carrier absorption loss, and consequently, dynamic loss. This is different than some conventional phase modulators, where the waveguide itself is doped to act as a heater or a carrier accumulation region.

In some embodiments, waveguides 121, 122 and 123 may be made of an undoped, or low-doped, semiconductor material (e.g., undoped silicon or silicon with a doping concentration less than $10^{14}$ cm$^{-3}$). In some embodiments, the resistivity of the material forming the waveguides may be greater than 1300 Ωcm.

FIG. 1E illustrates an example of a transition region 140, in accordance with some non-limiting embodiments. In this implementation, waveguide 122 is contiguous to (e.g., is the continuation of) input waveguide 102. As shown, waveguide 122 is tapered in the transition region such that its width reduces as it approaches the suspended multi-slot optical structure 120. By contrast, waveguides 121 and 123 are tapered in the transition region such that their widths increase as they depart from suspended multi-slot optical structure 120. The tapered waveguides may allow adiabatic coupling between the mode of input waveguide 102 and the mode of suspended multi-slot optical structure 120, thereby limiting coupling losses. A similar arrangement may be used for transition region 150. Due to the enhanced symmetry of the mode supported by the multi-slot structure, transition regions 140 and 150 are significantly shorter than other implementations. In some embodiments, the transition regions may be as short as 10 μm or less, or 5 μm or less, though other values are also possible.

Figure 2:
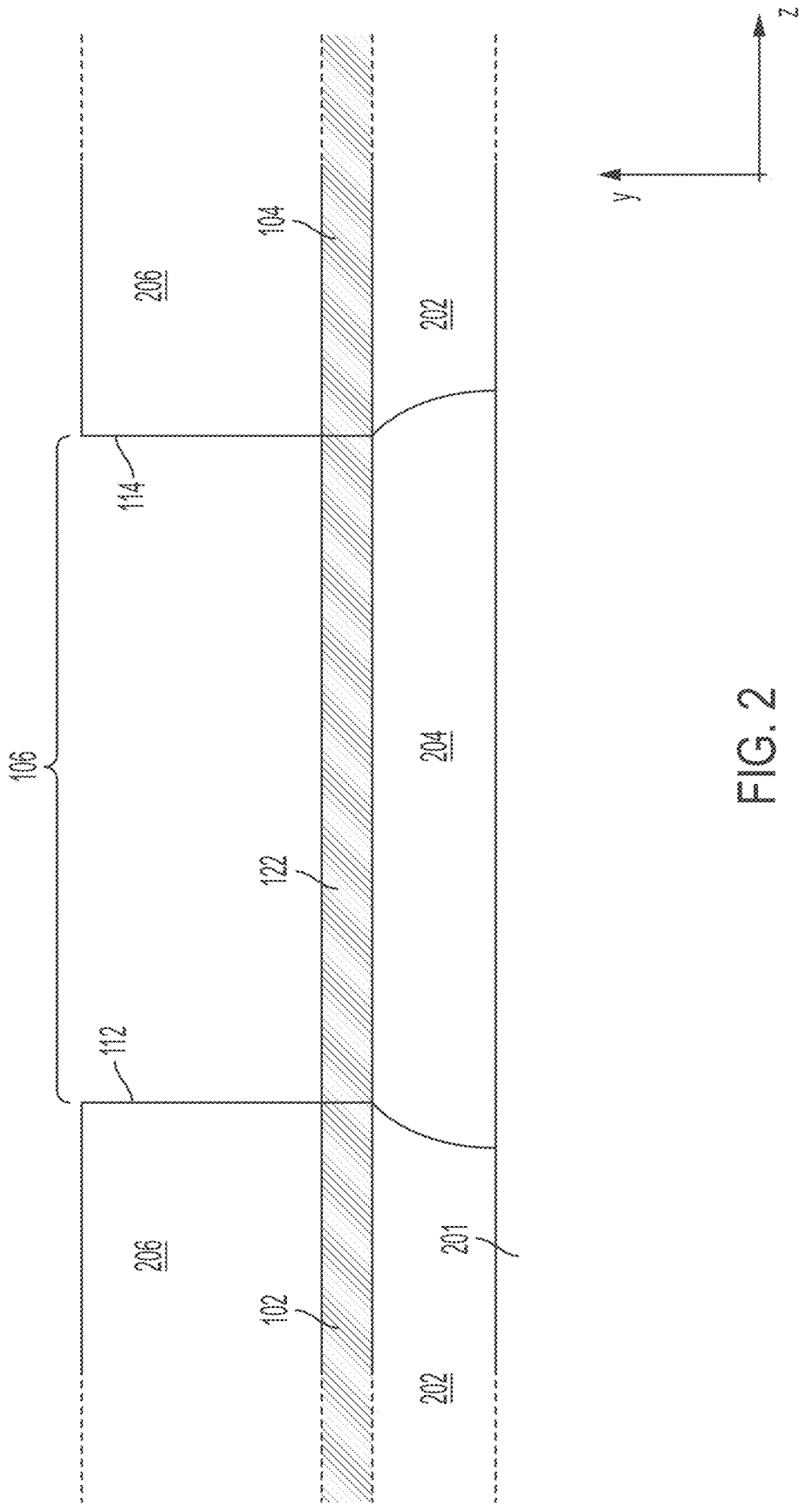
FIG. 2 is a cross-sectional view of the NOEMS phase modulator of FIG. 1A, taken in a yz-plane, and illustrating a suspended waveguide, in accordance with some non-limiting embodiments.

FIG. 2 is a cross sectional view of a NOEMS phase modulator 100 taken in a yz-plane passing through waveguide 122 (see plane 190 in FIG. 1B), in accordance with some non-limiting embodiments. Input waveguide 102 and output waveguide 104 are surrounded by a cladding made of a material (e.g., silicon oxide) with a refractive index lower than the refractive index of the core material. Lower cladding 202 is between the waveguide and the underlying substrate 201. Upper cladding 206 is formed over the waveguide.

To enable free motion of the waveguides of the suspended multi-slot optical structure 120, a trench 106 is formed through part of upper cladding 206. In some embodiments, a portion of the lower cladding 202 is removed under the suspended multi-slot optical structure 120, thus forming an undercut 204. As a result, waveguides 121, 122 and 123 are suspended in air and are free to move responsive to mechanical forces. A cladding/air interface exists at trench sidewall 112 and an air/cladding interface exists at trench sidewall 114. The sidewalls may be substantially vertical, for example if the trench is formed by reaction ion etching (RIE), or may alternatively be angled. Undercut 204 may have curved sidewalls, as illustrated in FIG. 2, if an isotropic etch is used, or may alternatively be substantially vertical. In some embodiments, trench 106 and undercut 204 may be formed as part of the same etch, while in other embodiments, they be formed using separate etches.

Figure 3:
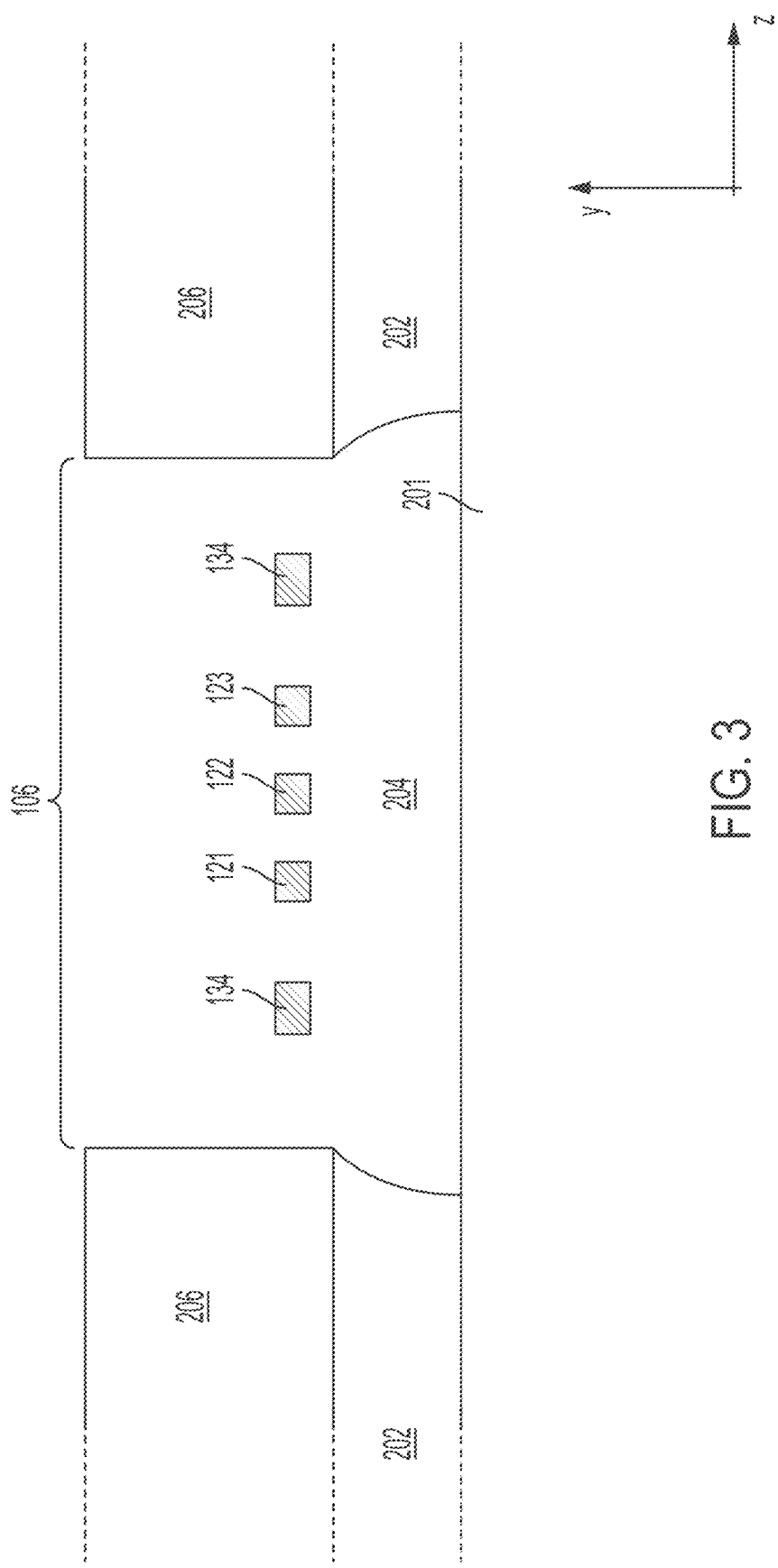
FIG. 3 is a cross-sectional view of the NOEMS phase modulator of FIG. 1A, taken in a xy-plane, and illustrating a portion of a suspended multi-slot optical structure, in accordance with some non-limiting embodiments.
Figure 4A:
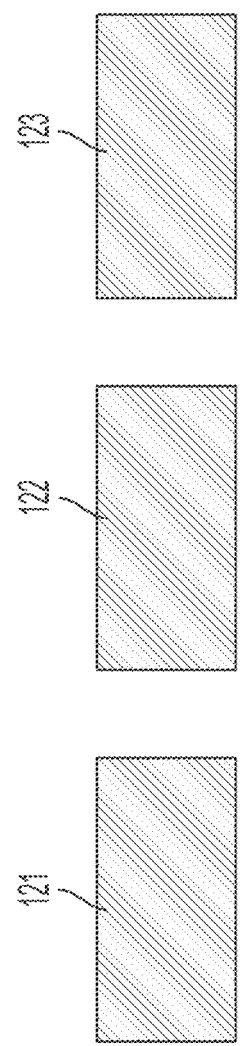
FIGS. 4A-4C are cross-sectional views illustrating how a suspended multi-slot optical structure can be mechanically driven to vary the widths of the slots between the waveguides, in accordance with some non-limiting embodiments.
Figure 4B:
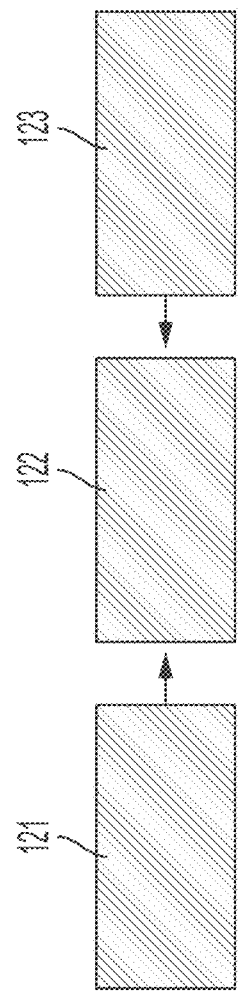
Figure 4C:
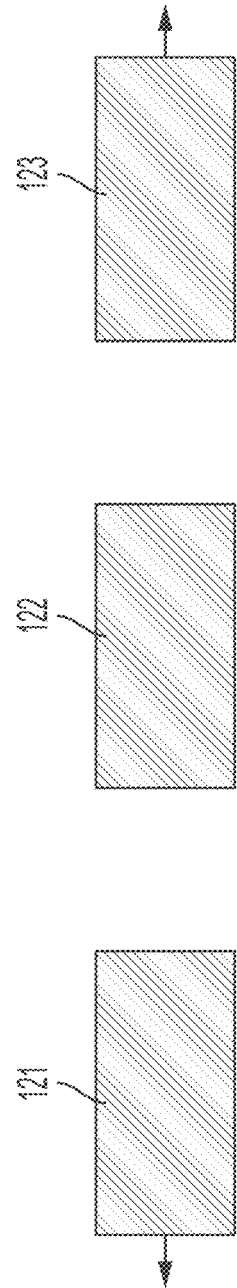

FIG. 3 is a cross sectional view of a NOEMS phase modulator 100 taken in a xy-plane passing through waveguides 121, 122 and 123 (see plane 191 in FIG. 1B), in accordance with some non-limiting embodiments. FIG. 3 shows that waveguides 121, 122 and 123 and beams 134, are co-planar (at least in this example), and are suspended in air above substrate 201. As further illustrated in this figure, waveguides 121, 122 and 123 do not contact lower cladding 202 at this cross section. When mechanical drivers 160 and 162 are actuated, beams 134 and waveguides 121 and 123 oscillate along the x-axis, thus varying the widths of the slots 124 and 125. An example of an oscillatory motion of waveguides 121 and 123 is illustrated, collectively, in FIGS. 4A-4C, in accordance with some non-limiting embodiments. FIG. 4A illustrates a case in which no mechanical force is applied. As a result, the widths of the slots are unperturbed. In FIG. 4B, a pair of forces is applied such that both waveguides 121 and 123 move towards waveguide 122, as illustrated by the arrows. As a result, the widths of the slots are reduced. In FIG. 4C, a pair of forces is applied such that both waveguides 121 and 123 move away from waveguide 122, also illustrated by the arrows. As a result, the widths of the slots are increased. In some embodiments, the forces may be applied in a periodic fashion, and/or following the pattern of the driving electrical signals. In some embodiments, the forces may be applied to waveguides 121 and 123 differentially, such that the same intensity is applied to both waveguides but with opposite signs.

Figure 5:
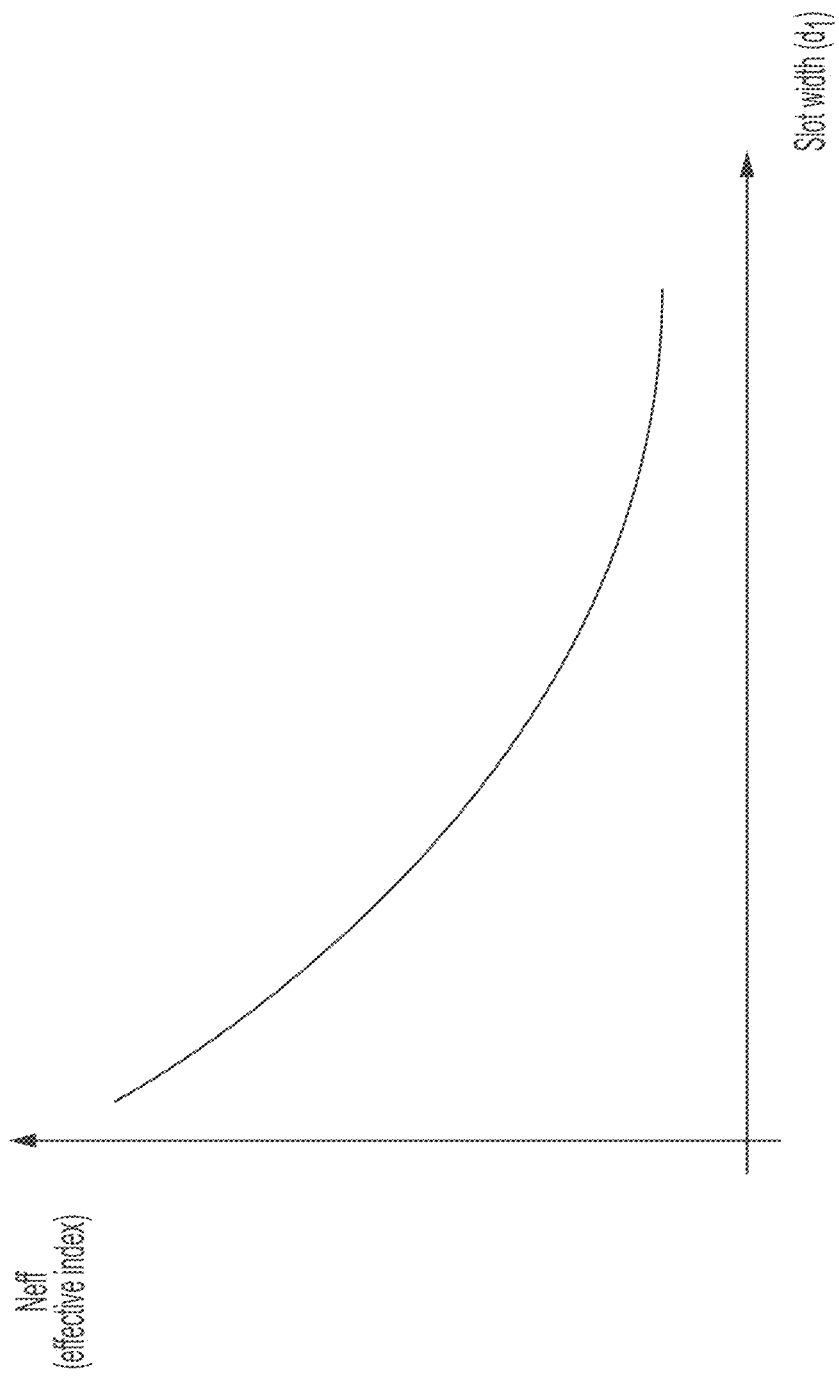
FIG. 5 is a plot illustrating how the effective index of a suspended multi-slot optical structure may vary as a function of the width of a slot, in accordance with some non-limiting embodiments.

FIG. 5 is a plot illustrating how the effective refractive index (Neff) of the mode propagating in the suspended multi-slot optical structure 120 varies as a function of width $d_1$ (the width of the slot between waveguides 121 and 122), in accordance with some non-limiting embodiments. A similar response may be plotted as a function of $d_2$. The effective index variation is caused by the fact that, as the separation between the waveguides varies under the effect of an applied mechanical force, the shape of the mode deviates relative to the one illustrated in FIG. 1C. As the width varies over time, so does the mode effective index, and consequently, the phase of the mode.

Figure 6:
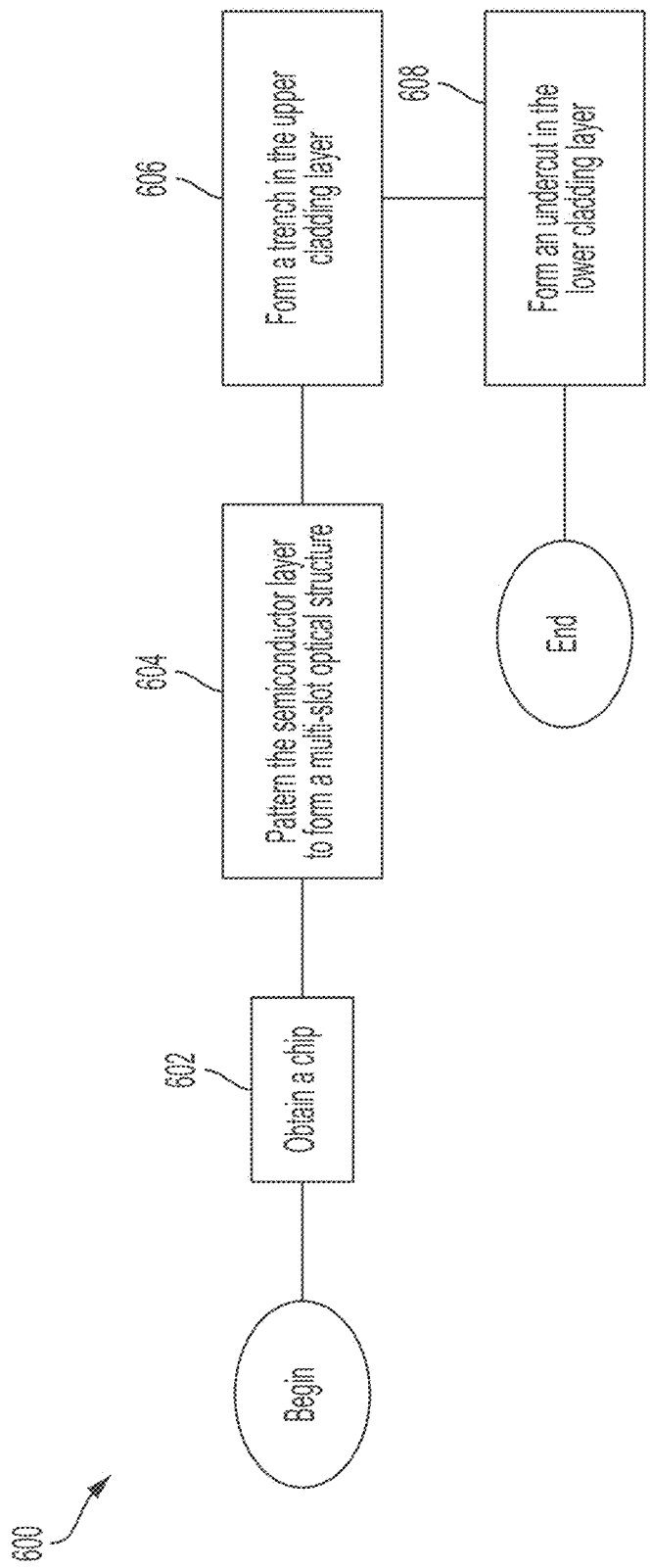
FIG. 6 is a flowchart illustrating an example of a method for fabricating a NOEMS phase modulator, in accordance with some non-limiting embodiments.

FIG. 6 is a flowchart illustrating an example of a method for fabricating a NOEMS phase modulator, in accordance with some non-limiting embodiments. It should be appreciated that the steps of the method described below may be performed in any suitable order, as fabrication processes are not limited to the specific order illustrated in FIG. 6.

Fabrication method 600 begins at step 602, in which a chip is obtained. In some embodiments, the chip may be a silicon-on-insulator chip, or a bulk silicon chip. The chip may have a substrate and any of the following layers: a lower cladding layer, a semiconductor layer and an upper cladding layer. The lower cladding layer may comprise silicon oxide in some embodiments. The semiconductor layer may comprises silicon, silicon nitride and/or doped silicon oxide in some embodiments. The upper cladding layer may comprise the same material forming the lower cladding layer, or a different material. FIG. 3. Illustrates an examples of a substrate (substrate 201) having a lower cladding layer (cladding 202), a semiconductor layer (the layer of waveguides 121, 122 and 123) and an upper cladding layer (cladding 206). It should be appreciated that any of the layers identified above may already be present on the chip when the chip arrives at the fabrication facility (where the NOEMS phase modulator is fabricated), or may be formed at the facility as part of the fabrication process.

At step 604, the semiconductor layer is patterned form a multi-slot optical structure having first and second slots (or any other number of slots greater than two). In the example of FIG. 3, waveguides 121, 122 and 123 may be formed at step 604. Patterning the semiconductor layer may involve deposition of a photoresist layer, a photolithographic exposure and etching through the semiconductor layer. In some embodiments, any one of mechanical structures 130 and 132, mechanical drivers 160 and 162, waveguides 102 and 104 and transition regions 140 and 142 (see FIG. 1A) are fabricated as part of the same photolithographic exposure, though not all embodiments are limited in this respect as one or more separate photolithographic exposures may be used. In some embodiments, at step 604, mechanical drivers 160 may be doped, for example using ion implantation. In some embodiments, the multi-slot optical structure may remain undoped.

At step 606, a trench may be formed through the upper cladding layer. An example of a trench (trench 106) is illustrated at FIG. 3. The trench may be formed, for example, using a dry etch such as a reactive ion etch. However, wet etches may alternatively or additionally be used. Formation of the trench may involve removal of a portion of the upper cladding layer in a region above the multi-slot optical structure formed at step 604. As a result, the multi-slot optical structure may be exposed, partially or entirely, to air.

At step 608, an undercut may be formed in the lower cladding layer. An example of an undercut (undercut 204) is illustrated at FIG. 3. The undercut may be formed, for example, using a wet etch, though dry etches may alternatively or additionally be used. Formation of the undercut may involve removal of a portion of the lower cladding layer in a region under the multi-slot optical structure. As a result, at least part of the multi-slot optical structure may be suspended over air.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A method for shifting a phase of an optical signal, the method comprising:
   providing the optical signal to a multi-slot optical structure formed on a substrate and having first, second and third optical waveguides arranged to form a first slot between the first optical waveguide and the second optical waveguide and a second slot between the second optical waveguide and the third optical waveguide;
   exciting a multi-slot optical mode defined in the multi-slot optical structure, the multi-slot optical mode has a first peak amplitude in the first optical waveguide and a second peak amplitude in the first slot, wherein the second peak amplitude is larger than the first peak amplitude; and
   varying a width of the first slot and/or a width of the second slot over time.

2. The method of claim 1, wherein the first and second peak amplitudes are electric field peak amplitudes.

3. The method of claim 1, wherein varying a width of the first slot and/or a width of the second slot over time comprises applying a mechanical force to the multi-slot optical structure via a mechanical structure.

4. The method of claim 3 wherein applying a mechanical force to the multi-slot optical structure comprises:
   applying the mechanical force to the first optical waveguide and the third optical waveguide.

5. The method of claim 1, wherein varying a width of the first slot and/or a width of the second slot over time comprises:
   increasing the width of the first slot and, simultaneously, increasing the width of the second slot.

6. The method of claim 5, varying a width of the first slot and/or a width of the second slot over time further comprises:
   reducing the width of the first slot and, simultaneously, reducing the width of the second slot.

7. The method of claim 1, wherein providing the optical signal to a multi-slot optical structure comprises adiabatically coupling the optical signal to the multi-slot optical structure using a tapered optical waveguide.

8. The method of claim 1, wherein the multi-slot optical mode is a symmetric mode.

9. A method for modulating a phase of an optical signal, the method comprising:
   providing the optical signal to a multi-slot optical structure formed on a substrate and having first, second and third co-planar suspended optical waveguides arranged to form a first slot between the first optical waveguide and the second optical waveguide and a second slot between the second optical waveguide and the third optical waveguide, wherein at least one of the first, second and third suspended optical waveguides has two fixed portions connected to the substrate and is suspended between the two fixed portions;
   exciting a multi-slot optical mode defined in the multi-slot optical structure; and
   varying a width of the first slot and/or a width of the second slot over time.

10. The method of claim 9, wherein varying a width of the first slot and/or a width of the second slot over time comprises:
    moving the first optical waveguide relative to the second optical waveguide and/or moving the third optical waveguide relative to the second optical waveguide.

11. The method of claim 9, wherein varying a width of the first slot and/or a width of the second slot over time comprises:
    moving the first optical waveguide towards the second optical waveguide and, simultaneously, moving the third optical waveguide towards the second optical waveguide.

12. The method of claim 11, wherein varying a width of the first slot and/or a width of the second slot over time further comprises:
    moving the first optical waveguide away from the second optical waveguide and, simultaneously, moving the third optical waveguide away from the second optical waveguide.

13. The method of claim 11, wherein moving the first and third optical waveguides comprises moving the first and third optical waveguides inside a trench in which the first, second and third optical waveguides are disposed, the trench being formed in the substrate.

14. The method of claim 9, wherein providing the optical signal to a multi-slot optical structure comprises adiabatically coupling the optical signal to the multi-slot optical structure using a tapered optical waveguide.

15. The method of claim 9, wherein varying a width of the first slot and/or a width of the second slot over time comprises applying an electrical modulating signal to a mechanical actuator connected to the multi-slot optical structure.

16. A method for modulating a phase of an optical signal, the method comprising:
    adiabatically coupling the optical signal to a multi-slot optical structure formed on a substrate and having first, second and third co-planar suspended optical waveguides arranged so that the second optical waveguide is positioned between the first optical waveguide and the third optical waveguide;
    exciting a multi-slot optical mode defined in the multi-slot optical structure; and
    varying a separation between the first and second optical waveguides and/or varying a separation between the third and second optical waveguides.

17. The method of claim 16, wherein adiabatically coupling the optical signal to a multi-slot optical structure comprises transmitting the optical signal through a tapered optical waveguide.

18. The method of claim 16, wherein transmitting the optical signal through a tapered optical waveguide comprises exciting an optical mode configured to laterally expand as the optical signal propagates along the tapered optical waveguide.

19. The method of claim 16, wherein varying a separation between the first and second optical waveguides and/or varying a separation between the third and second optical waveguides comprises:
    moving the first optical waveguide relative to the second optical waveguide and/or moving the third optical waveguide relative to the second optical waveguide.

20. The method of claim 16, wherein varying a separation between the first and second optical waveguides and/or varying a separation between the third and second optical waveguides comprises:

moving the first optical waveguide towards the second optical waveguide and, simultaneously, moving the third optical waveguide towards the second optical waveguide.

* * * * *